United States Patent
Shrestha et al.

(10) Patent No.: US 12,289,665 B2
(45) Date of Patent: Apr. 29, 2025

(54) TECHNIQUES TO FACILITATE ON-DEMAND EPHEMERIS AND BEAM INFORMATION REQUESTS

(71) Applicant: QUALCOMM Incorporated, San Diego, CA (US)

(72) Inventors: Bharat Shrestha, San Diego, CA (US); Umesh Phuyal, San Diego, CA (US); Alberto Rico Alvarino, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 682 days.

(21) Appl. No.: 17/467,121

(22) Filed: Sep. 3, 2021

(65) Prior Publication Data

US 2023/0074161 A1    Mar. 9, 2023

(51) Int. Cl.
| | | |
|---|---|---|
| *H04B 7/216* | (2006.01) | |
| *H04B 7/185* | (2006.01) | |
| *H04W 48/10* | (2009.01) | |
| *H04W 48/14* | (2009.01) | |
| *H04W 84/04* | (2009.01) | |

(52) U.S. Cl.
CPC ........ *H04W 48/10* (2013.01); *H04B 7/18513* (2013.01); *H04B 7/1858* (2013.01); *H04W 48/14* (2013.01); *H04W 84/042* (2013.01)

(58) Field of Classification Search
None
See application file for complete search history.

(56) References Cited

U.S. PATENT DOCUMENTS

2021/0273719 A1    9/2021    Wang et al.

FOREIGN PATENT DOCUMENTS

| EP | 3869906 A1 | 8/2021 |
|---|---|---|
| WO | 2017142584 | 8/2017 |
| WO | 2020030715 A1 | 2/2020 |
| WO | 2020197271 A1 | 10/2020 |
| WO | 2022084946 A1 | 4/2022 |
| WO | 2022130217 A1 | 6/2022 |

OTHER PUBLICATIONS

International Search Report and Written Opinion—PCT/US2022/039250—ISA/EPO—Nov. 17, 2022.
Lenovo et al., "Considerations on Ephemeris Provision for NTN", 3GPP TSG-RAN WG2 Meeting #114 electronic, R2-2105818, 3rd Generation Partnership Project, Mobile Competence Centre, 650, Route Des Lucioles, F-06921 Sophia-Antipolis Cedex, France, vol. RAN WG2, No. Electronic, May 19-May 27, 2021, 4 Pages, May 11, 2021, XP052007295, p. 4.

*Primary Examiner* — Willie J Daniel, Jr.
(74) *Attorney, Agent, or Firm* — Procopio, Cory, Hargreaves & Savitch LLP

(57) ABSTRACT

Apparatus, methods, and computer-readable media for facilitating on-demand ephemeris and beam information requests are disclosed herein. An example method for wireless communication at a UE includes transmitting a request for requested information, the requested information including one or more of system information and satellite information. The example method also includes receiving a response message based on the request, the response message including one or more of: an NTN system information block, satellite information associated with at least one requested communication satellite, and beam information associated with the at least one requested communication satellite.

37 Claims, 16 Drawing Sheets

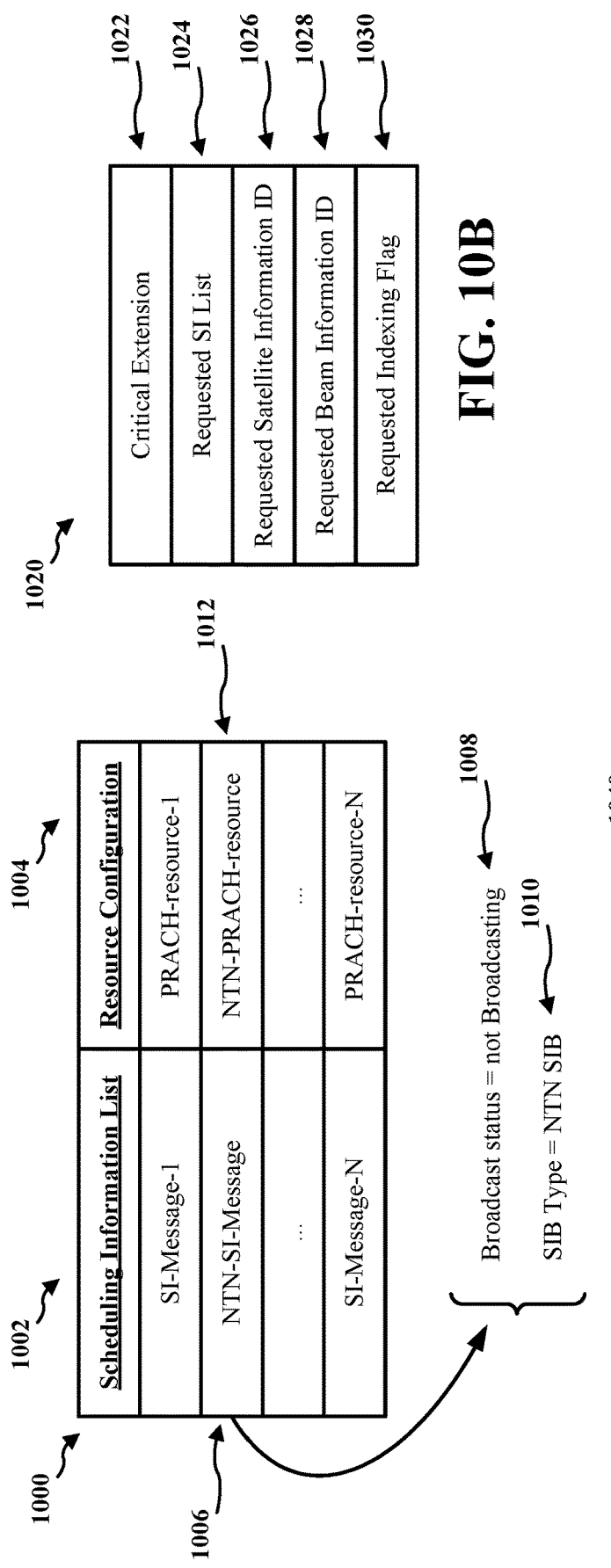
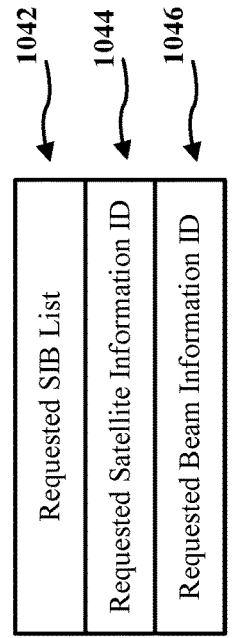
FIG. 10A
FIG. 10B
FIG. 10C

TECHNIQUES TO FACILITATE ON-DEMAND EPHEMERIS AND BEAM INFORMATION REQUESTS

TECHNICAL FIELD

The present disclosure relates generally to communication systems, and more particularly, to wireless communication utilizing non-terrestrial networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a wireless communication system, some information about the communication system may be broadcast as system information. A non-terrestrial network (NTN) may broadcast system information that provides information specific to non-terrestrial communication. A satellite may broadcast information for wireless communication with the satellite and/or information about neighbor satellites, inter-frequency satellites, intra-frequency satellites, future satellite information, etc. The amount of information may be large, and a network may broadcast a subset of satellite information in order to reduce a message size. Aspects presented herein provide various mechanisms for a user equipment (UE) to indicate a request for additional system information associated with a NTN or satellite and for the network to provide the particular system information requested by the UE. As an example, a UE may request additional information about an ephemeris, beam pattern information, neighbor satellite information, among other examples of system information that may be requested by the UE.

In an aspect of the disclosure, a method, a computer-readable medium, and an apparatus are provided for wireless communication at a user equipment (UE). An example apparatus may transmit a request for requested information, the requested information including one or more of system information (SI) and satellite information. The example apparatus may also receive a response message based on the request, the response message including one or more of: a non-terrestrial network (NTN) system information block (SIB), satellite information associated with at least one requested communication satellite, and beam information associated with the at least one requested communication satellite.

In an aspect of the disclosure, a method, a computer-readable medium, and an apparatus are provided for wireless communication at a base station. An example apparatus may receive a request for requested information for a UE, the requested information including one or more of SI and satellite information. The example apparatus may also transmit transmitting a response message based on the request, the response message including one or more of: an NTN SIB, satellite information associated with at least one requested communication satellite, and beam information associated with the at least one requested communication satellite.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10A illustrates example SI scheduling information, in accordance with various aspects of the present disclosure.

FIG. 10B illustrates an example RRC SI request message, in accordance with various aspects of the present disclosure.

FIG. 10C illustrates an example NTN dedicated request message, in accordance with various aspects of the present disclosure.

DETAILED DESCRIPTION

Figure 1:
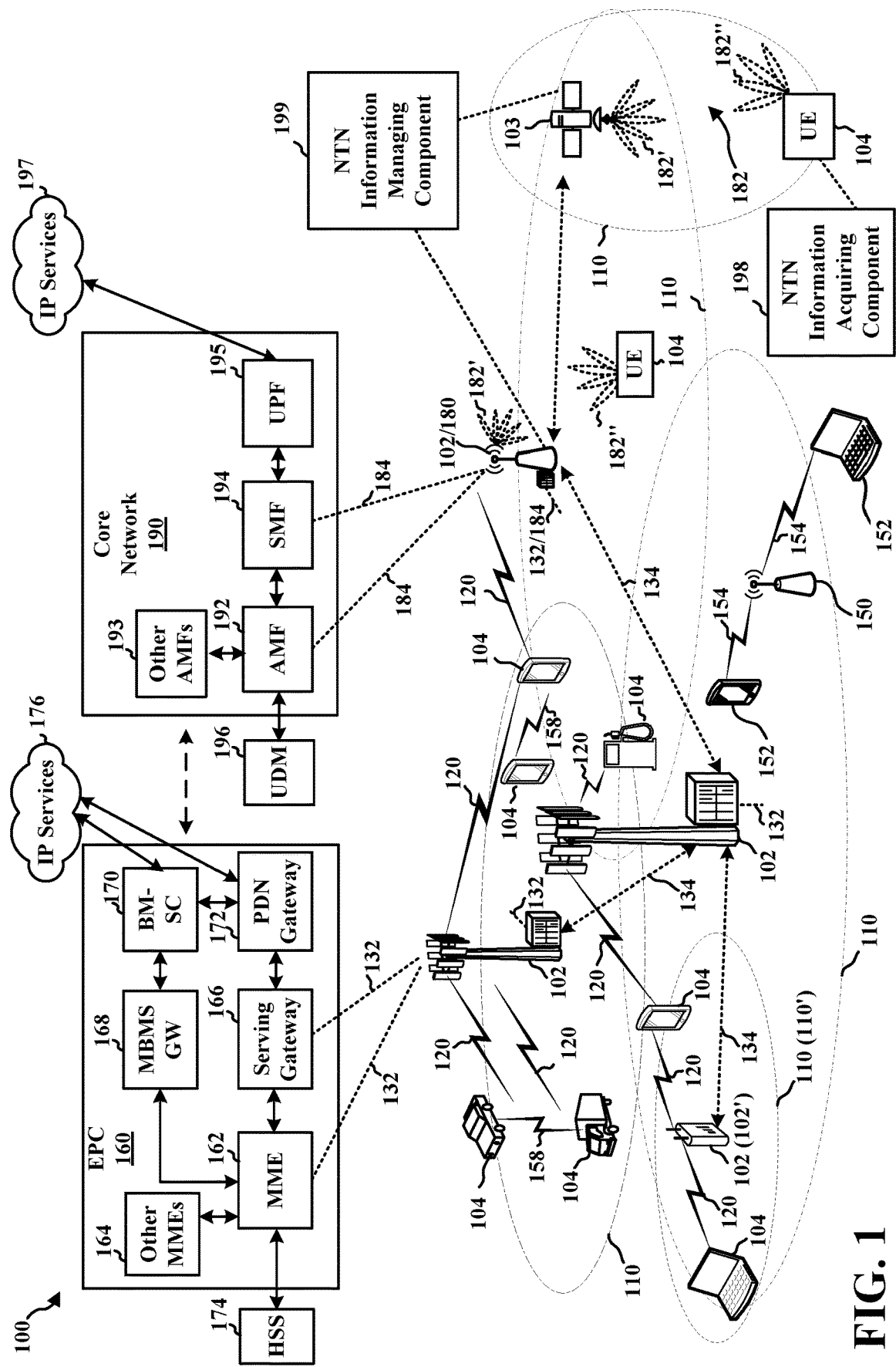
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 including base stations 102, 180 and UEs 104. In certain aspects, the UE 104 may be configured to access a radio cell supported by an NTN device 103. The NTN device 103 may be referred to as a spaceborne vehicle or an airborne vehicle. In some examples, the NTN device 103 may be configured to operate as a relay for communications between the UEs 104 and the base stations 102, 180. In such examples, the NTN device 103 may be referred to as a transparent payload and the base stations 102, 180 may be referred to as terrestrial base stations 102, 180. In some examples, the NTN device 103 may include an on-board base station and/or a disaggregated base station. In such examples, the NTN device 103 may be referred to as a regenerative payload and/or as an NTN base station.

In certain aspects, a device in communication with a base station, such as a UE 104, may be configured to manage one or more aspects of wireless communication by facilitating requests for on-demand NTN system information. For example, the UE 104 may include an NTN information acquiring component 198 configured to transmit a request for requested information, the requested information including one or more of SI and satellite information. The example NTN information acquiring component 198 may also be configured to receive a response message based on the request, the response message including one or more of: an NTN SIB, satellite information associated with at least one requested communication satellite, and beam information associated with the at least one requested communication satellite.

In another configuration, a base station, such as the terrestrial base stations 102, 180 and/or an NTN base station provided by the NTN device 103, may be configured to manage or more aspects of wireless communication by facilitating on-demand NTN-SI requests. For example, the terrestrial base stations 102, 180 and/or the NTN device 103 may include an NTN information managing component 199 configured to receive a request for requested information for a UE, the requested information including one or more of SI and satellite information. The example NTN information managing component 199 may also be configured to transmit a response message based on the request, the response message including one or more of: an NTN SIB, satellite information associated with at least one requested communication satellite, and beam information associated with the at least one requested communication satellite.

The aspects presented herein enable on-demand satellite information and/or beam information requests. For example, aspects disclosed herein enable a UE to transmit an on-demand request for NTN-related information, satellite-related information associated with at least one communication satellite, and/or beam-related information associated with at least one communication satellite, which may facilitate improving communication performance, for example, by reducing overhead and improving cell coverage.

Although the following description provides examples directed to 5G NR (and, in particular, to transmissions to facilitate an NTN), the concepts described herein may be applicable to other similar areas, such as LTE, LTE-A, CDMA, GSM, and/or other wireless technologies, in which on-demand system information requests may be employed.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
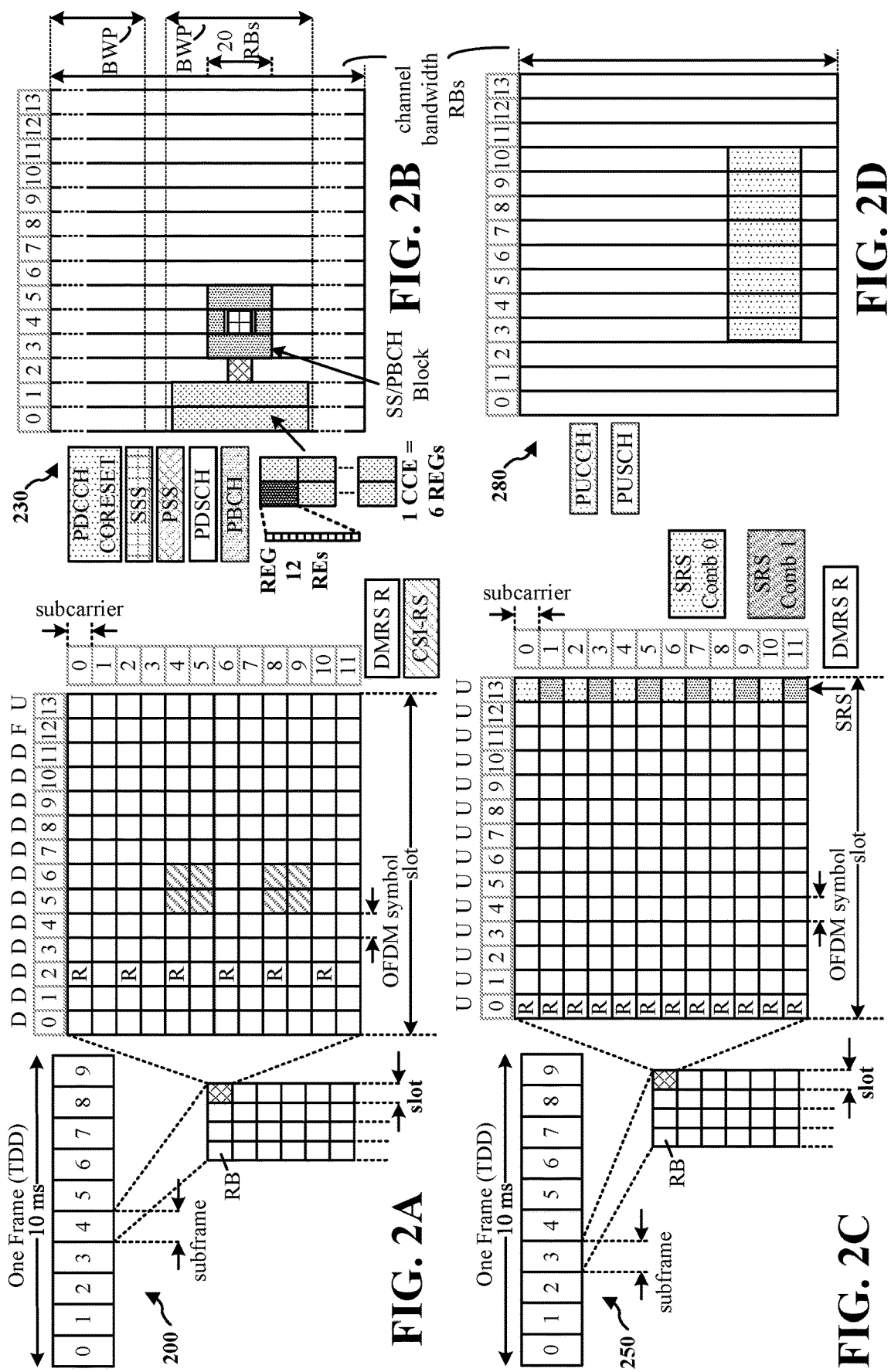
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
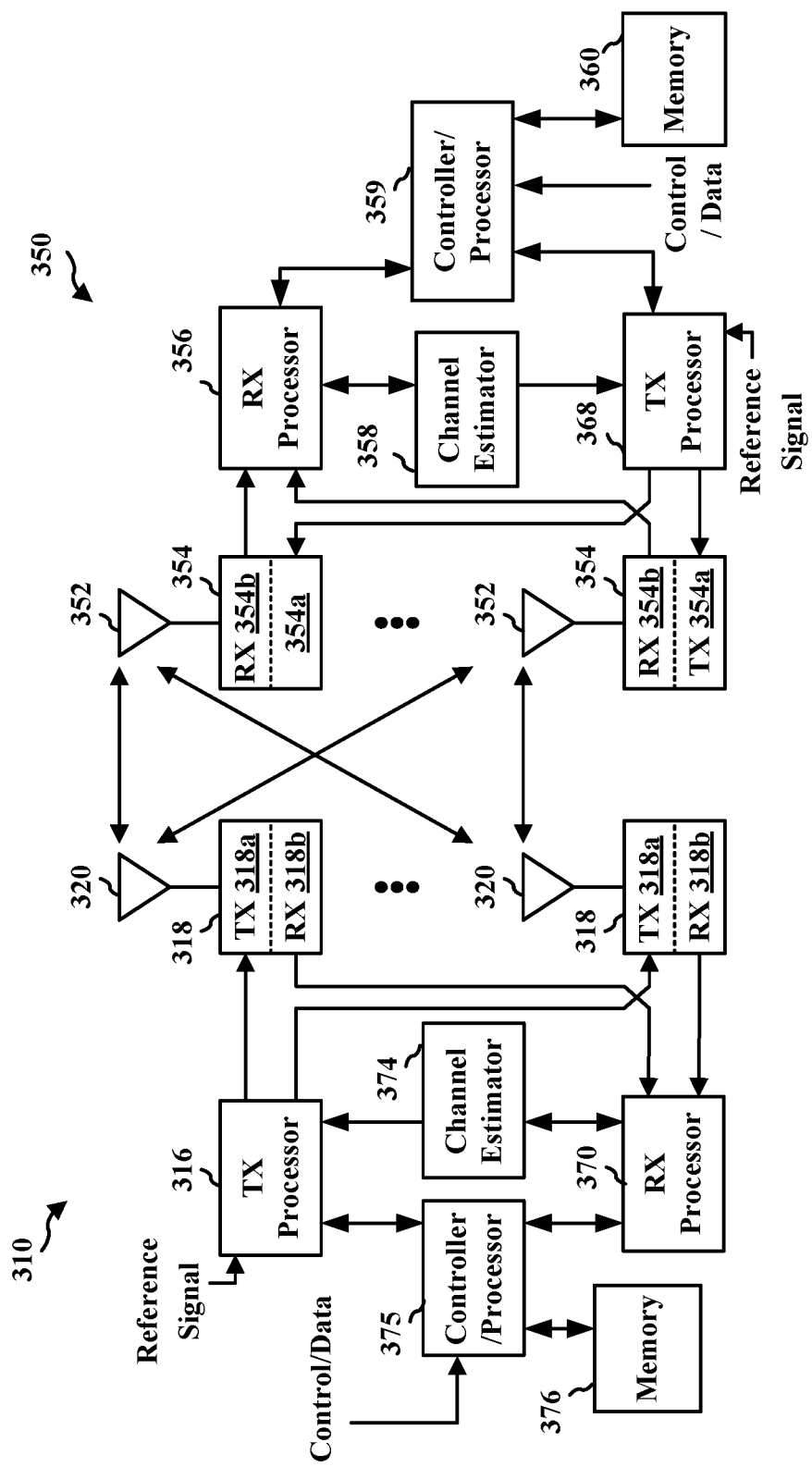
FIG. 3 is a diagram illustrating an example of a base station and a UE in an access network.

FIG. 3 is a block diagram that illustrates an example of a first wireless device that is configured to exchange wireless communication with a second wireless device. In the illustrated example, the first wireless device may include a base station 310, the second wireless device may include a UE 350, and the base station 310 may be in communication with the UE 350 in an access network. As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the NTN information acquiring component 198 of FIG. 1.

At least one of the TX processor 316, the RX processor 370, and the controller/processor 375 may be configured to perform aspects in connection with the NTN information managing component 199 of FIG. 1.

Satellites may be integrated with the terrestrial infrastructure of a wireless communication system. Satellites may refer to Low Earth Orbit (LEO) devices, Medium Earth Orbit (MEO) devices, Geostationary Earth Orbit (GEO) devices, and/or Highly Elliptical Orbit (HEO) devices. A non-terrestrial network (NTN) may refer to a network, or a segment of a network, that uses an airborne or spaceborne vehicle for transmission. An airborne vehicle may refer to High Altitude Platforms (HAPs) including Unmanned Aircraft Systems (UAS).

An NTN may help improve the roll-out of wireless communication (e.g., a 5G network) in un-served or under-served areas to upgrade the performance of terrestrial networks. For example, a communication satellite may provide coverage to a larger geographic region than a TN base station. The NTN may also reinforce service reliability by providing service continuity for user equipment or for moving platforms (e.g., passenger vehicles-aircraft, ships, high speed trains, buses). In some examples, the NTN may increase service availability, including critical communications. In some examples, the NTN may enable network scalability through the provision of efficient multicast/broadcast resources for data delivery towards the network edges or even directly to the user equipment.

Figure 4:
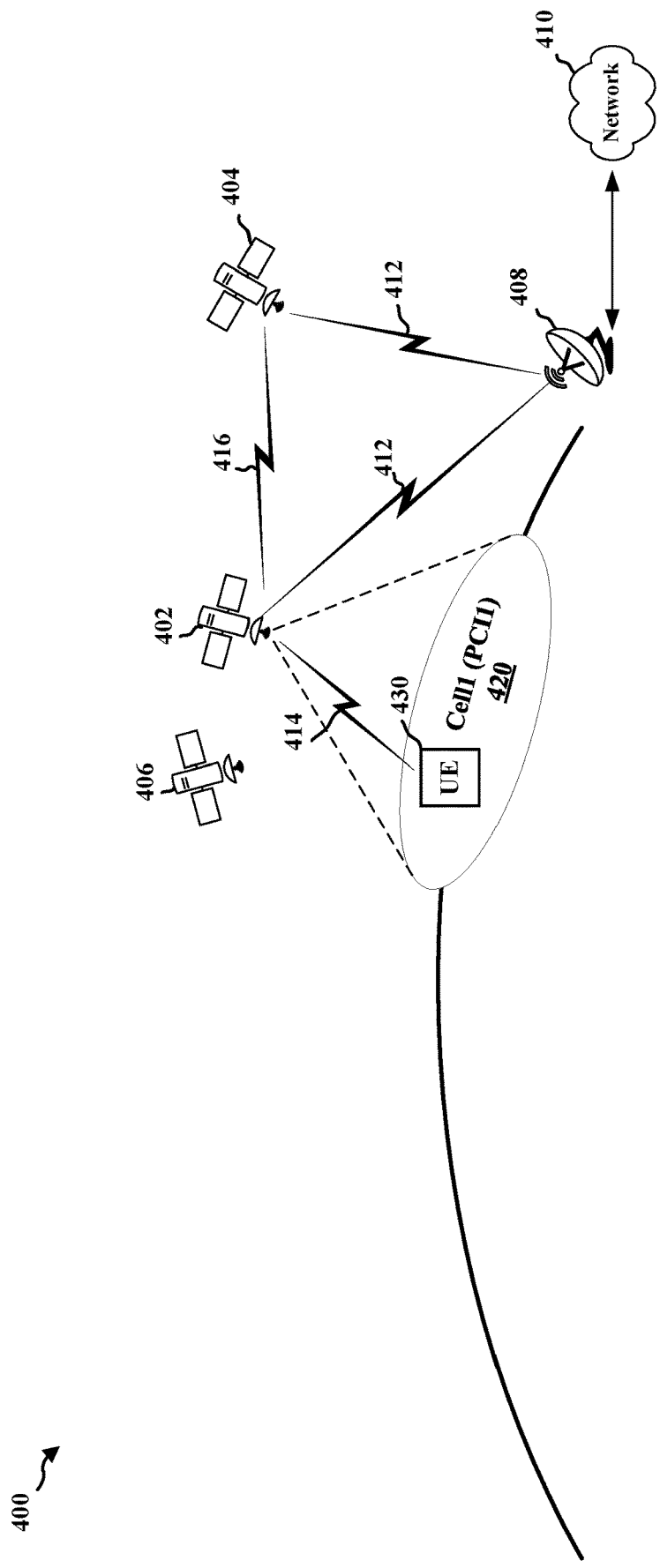
FIG. 4 illustrates an example configuration of an NTN, in accordance with various aspects of the present disclosure.

FIG. 4 illustrates an example configuration of an NTN 400, as presented herein. An NTN may refer to a network, or a segment of a network, that uses RF resources on-board an NTN platform. The NTN platform may refer to a spaceborne vehicle or an airborne vehicle. Spaceborne vehicles include communication satellites that may be classified based on their orbits. For example, a communication satellite may include a GEO device that appears stationary with respect to the Earth. As such, a single GEO device may provide coverage to a geographic coverage area. In other examples, a communication satellite may include a non-GEO device, such as an LEO device, an MEO device, or an HEO device. Non-GEO devices do not appear stationary with respect to the Earth. As such, a satellite constellation (e.g., one or more satellites) may be configured to provide coverage to the geographic coverage area. An airborne vehicle may refer to a system encompassing Tethered UAS (TUA), Lighter Than Air UAS (LTA), Heavier Than Air UAS (HTA), e.g., in altitudes typically between 8 and 50 km including High Altitude Platforms (HAPs).

In some aspects, the NTN 400 may comprise an NR-NTN. The example of FIG. 4 provides that the NTN 400 may include a first NTN device 402, a second NTN device 404, a third NTN device 406, an NTN gateway 408, a data network 410, and a UE 430 within a cell coverage of the first NTN device 402.

In some aspects, the UE 430 may include IoT devices, and the UE may be connected to the NTN 400 for wireless communication.

The NTN gateway 408 may be one of one or more NTN gateways that may connect the NTN 400 to a public data network. In some examples, the NTN gateway 408 may support functions to forward a signal from the NTN device to a Uu interface, such as an NR-Uu interface. In other examples, the NTN gateway 408 may provide a transport network layer node, and may support transport protocols, such as acting as an IP router. A satellite radio interface (SRI) may provide IP trunk connections between the NTN gateway 408 and the NTN device to transport NG or F1 interfaces, respectively. One or more geosynchronous equatorial orbit (GEO) devices (e.g., which may be referred to herein as the first NTN device 402, the second NTN device 404, or the third NTN device 406) may be fed by the NTN gateway 408, and the one or more NTN devices may be deployed across the satellite targeted coverage, which may correspond to regional coverage or even continental coverage. A non-GEO device may be served successively by one or more NTN gateways at a time, and the NTN 400 may be configured to provide service and feeder link continuity between the successive serving NTN gateways with time duration to perform mobility anchoring and handover.

The first NTN device 402, including spaceborne vehicles or airborne vehicles, may communicate with the data network 410 through a feeder link 412 established between the first NTN device 402 and the NTN gateway 408 in order to provide service to the UE 430 within the cell coverage, or a field-of-view of an NTN cell 420, of the first NTN device 402 via a service link 414. The feeder link 412 may include a wireless link between an NTN gateway and an NTN device. The service link 414 may refer to a radio link between an NTN device (e.g., the first NTN device 402) and the UE 430. As described in connection with FIG. 1, the first NTN device 402 may use one or more directional beams, e.g., beamforming, to exchange communication with the UE 430. A beam may refer to a wireless communication beam generated by an antenna on-board an NTN device.

In some examples, the UE 430 may communicate with the first NTN device 402 via the service link 414. The second NTN device 404 may relay the communication for the first NTN device 402 through an inter-satellite link (ISL) 416, and the second NTN device 404 may communicate with the data network 410 through the feeder link 412 established between the second NTN device 404 and the NTN gateway 408. The ISL links may be provided between a constellation of satellites and may involve the use of transparent payloads on-board the NTN devices. The ISL may operate in an RF frequency or an optical band.

In the illustrated example of FIG. 4, the first NTN device 402 may provide the NTN cell 420 with a first physical cell ID (PCI) ("PCI1"). In some examples, a constellation of satellites may provide coverage to the NTN cell 420. For example, the first NTN device 402 may include a non-GEO device that does not appear stationary with respect to the Earth. As such, a satellite constellation (e.g., one or more satellites) may be configured to provide coverage to the NTN cell 420. For example, the first NTN device 402 and the third NTN device 406 may be part of a satellite constellation that provides coverage to the NTN cell 420.

The first NTN device 402, the second NTN device 404, and/or the third NTN device 406 of FIG. 4 may include an NTN information managing component, similar to the NTN information managing component 199 described in connection with FIG. 1. The UE 430 of FIG. 4 may include an NTN information acquiring component, similar to the NTN information acquiring component 198 described in connection with FIG. 1.

In some examples, an NTN deployment may provide different services based on the type of payload on-board the NTN device. The type of payload may determine whether the NTN device acts as a relay node or a base station. For example, a transport payload may implement frequency conversion and a radio frequency (RF) amplifier in both uplink (UL) and downlink (DL) directions and may correspond to an analog RF repeater. A transparent payload, for example, may receive UL signals from all served UEs and may redirect the combined signals DL to an earth station without demodulating or decoding the signals. Similarly, a transparent payload may receive an UL signal from an earth station and redirect the signal DL to served UEs without demodulating or decoding the signal. However, the transparent payload may frequency convert received signals and may amplify and/or filter received signals before transmitting the signals.

Figure 5:
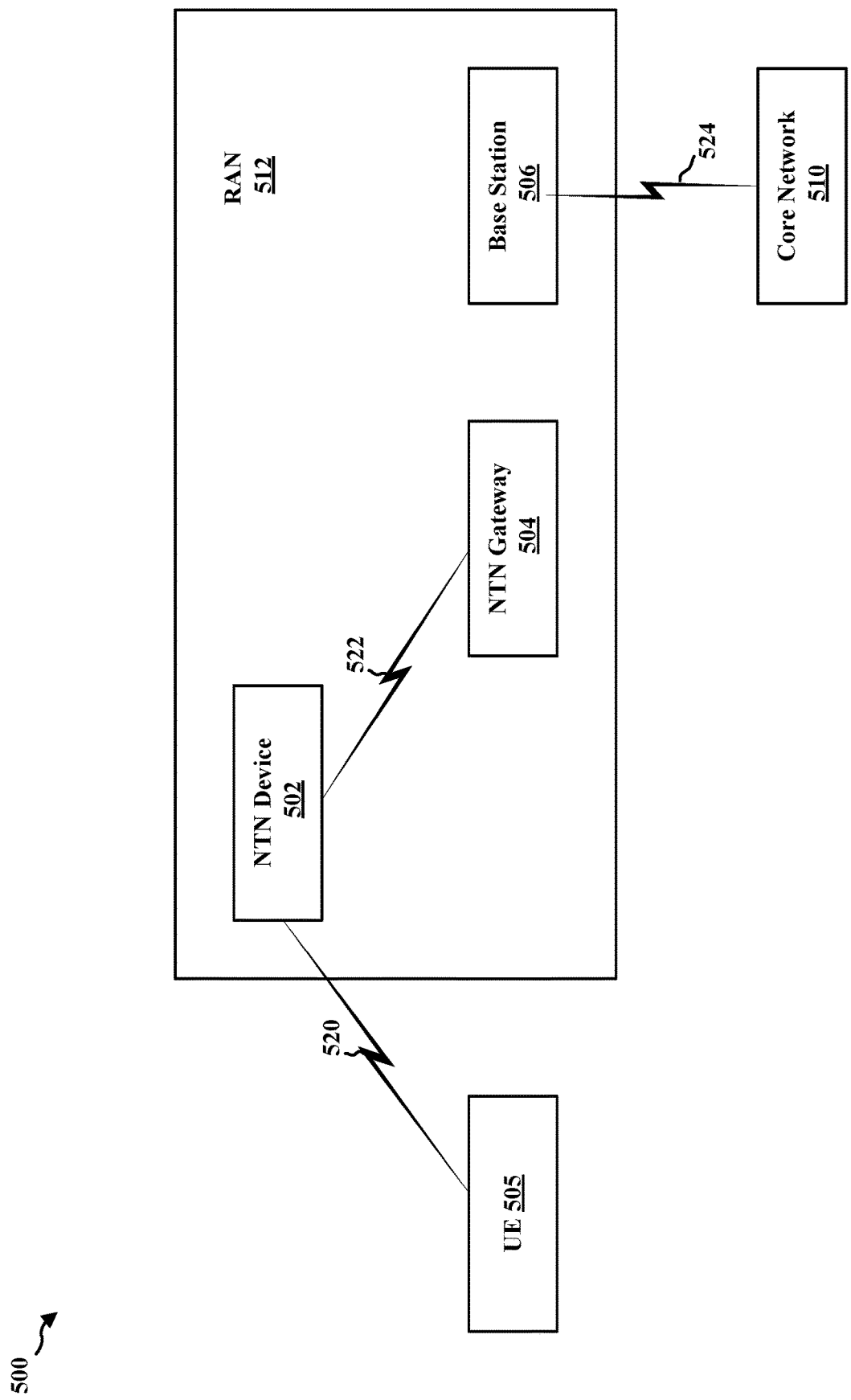
FIG. 5 illustrates an example network architecture capable of supporting NTN access, in accordance with various aspects of the present disclosure.

FIG. 5 illustrates an example network architecture 500 capable of supporting NTN access, e.g., using 5G NR, as presented herein. Although the aspects are described using the example of 5G NR, the concepts presented herein may also be applied for other types of core networks. FIG. 5 illustrates a network architecture with transparent payloads.

The network architecture 500 of FIG. 5 includes a UE 505, an NTN device 502, an NTN gateway 504 (sometimes referred to as "gateways," "earth stations," or "ground stations"), and a base station 506 having the capability to communicate with the UE 505 via the NTN device 502. The NTN device 502, the NTN gateway 504, and the base station 506 be part of a RAN 512 (e.g., an NG RAN).

The base station 506 may correspond to the base station 310 of FIG. 3. The network architecture 500 is illustrated as further including a core network 510. In some aspects, the core network 510 may include a number of Fifth Generation (5G) networks including 5G Core Networks (5GCNs) and may correspond to the core network 190 described in connection with FIG. 1. The core network 510 may be public land mobile networks (PLMN) that may be located in the same country or in different countries. In some aspects, the core network may be 5GCNs.

Permitted connections in the network architecture 500 with transparent payloads illustrated in FIG. 5, allow the base station 506 to access the NTN gateway 504 and the core network 510. In some examples, the base station 506 may be shared by multiple PLMNs. Similarly, the NTN gateway 504 may be shared by more than one base station.

FIG. 5 provides only a generalized illustration of various components, any or all of which may be utilized as appropriate, and each of which may be duplicated or omitted, as necessary. Specifically, although the example of FIG. 5 includes one UE 505, it will be understood that many UEs (e.g., hundreds, thousands, millions, etc.) may utilize the network architecture 500. Similarly, the network architecture 500 may include a larger (or smaller) number of NTN devices, NTN gateways, base stations, RAN, core networks, and/or other components. The illustrated connections that connect the various components in the network architecture 500 include data and signaling connections which may include additional (intermediary) components, direct or indirect physical and/or wireless connections, and/or additional networks. Furthermore, components may be rearranged, combined, separated, substituted, and/or omitted, depending on desired functionality.

While aspects of FIG. 5 illustrate a 5G-based network, similar network implementations and configurations may be used for other communication technologies, such as 3G, 5G LTE, etc.

The UE 505 is configured to communicate with the core network 510 via the NTN device 502, the NTN gateway 504, and the base station 506. As illustrated by the RAN 512, one or more RANs associated with the core network 510 may include one or more base stations. Access to the network may be provided to the UE 505 via wireless communication between the UE 505 and the base station 506 (e.g., a serving base station), via the NTN device 502 and the NTN gateway 504. The base station 506 may provide wireless communications access to the core network 510 on behalf of the UE 505, e.g., using 5G NR.

The base station 506 may be referred to by other names such as a gNB, a "satellite node", a satellite NodeB (sNB), or "satellite access node." The base station 506 may not be the same as terrestrial gNBs, but may be based on a terrestrial gNB with additional capability. For example, the base station 506 may terminate the radio interface and associated radio interface protocols to the UE 505 and may transmit DL signals to the UE 505 and receive UL signals from the UE 505 via the NTN device 502 and the NTN gateway 504. The base station 506 may also support signaling connections and voice and data bearers to the UE 505 and may support handover of the UE 505 between different radio cells for the NTN device 502, between different NTN devices and/or between different base stations. The base station 506 may be configured to manage moving radio beams (e.g., for airborne vehicles and/or non-GEO devices) and associated mobility of the UE 505. The base station 506 may assist in the handover (or transfer) of the NTN device 502 between different NTN gateways, different base stations, and between different countries. In some examples, the base station 506 may be separate from the NTN gateway 504, e.g., as illustrated in the example of FIG. 5. In some examples, the base station 506 may include or may be combined with one or more NTN gateways, e.g., using a split architecture. For example, with a split architecture, the base station 506 may include a Central Unit (CU) and the NTN gateway 504 may include or act as Distributed Unit (DU). The base station 506 may be fixed on the ground with transparent payload operation. In one implementation, the base station 506 may be physically combined with, or physically connected to, the NTN gateway 504 to reduce complexity and cost.

The NTN gateway 504 may be shared by more than one base station and may communicate with the UE 505 via the NTN device 502. The NTN gateway 504 may be dedicated to one associated constellation of NTN devices. The NTN gateway 504 may be included within the base station 506, e.g., as a base station-DU within the base station 506. The NTN gateway 504 may communicate with the NTN device 502 using control and user plane protocols. The control and user plane protocols between the NTN gateway 504 and the NTN device 502: (i) establish and release the NTN gateway 504 to the NTN device 502 communication links, including authentication and ciphering; (ii) update NTN device software and firmware; (iii) perform NTN device Operations and Maintenance (O&M); (iv) control radio beams (e.g., direction, power, on/off status) and mapping between radio beams and NTN gateway UL and DL payload; and/or (v) assist with handoff of the NTN device 502 or radio cell to another NTN gateway.

Support of transparent payloads with the network architecture 500 shown in FIG. 5 may impact the communication system as follows. The core network 510 may treat a satellite RAT as a new type of RAT with longer delay, reduced bandwidth and/or higher error rate. Consequently, there may be some impact to PDU session establishment and mobility management (MM) and connection management (CM) procedures. The NTN device 502 may be shared with other services (e.g., satellite TV, fixed Internet access) with 5G NR mobile access for UEs added in a transparent manner. This may enable legacy NTN devices to be used and may avoid the need to deploy a new type of NTN device. Further, the base station 506 may be fixed and may be configured to support one country or multiple countries and one or more PLMNs in that one country or in those multiple countries. The base station 506 may assist assignment and transfer of the NTN device 502 and radio cells between the base station 506 and the NTN gateway 504 and support handover of the UE 505 between radio cells, NTN devices, and other base stations. Thus, the base station 506 may differ from a terrestrial gNB. Additionally, a coverage area of the base station 506 may be much larger than the coverage area of a terrestrial base station.

In some implementations, the radio beam coverage of the NTN device 502 may be large, e.g., up to or greater than 4000 kms across, and may provide access to more than one country. The base station 506 may be shared by multiple base stations, and the base station 506 may be shared by multiple core networks in separate PLMNs located in the same country or in different countries.

In the illustrated example of FIG. 5, a service link 520 may facilitate communication between the UE 505 and the NTN device 502, a feeder link 522 may facilitate communication between the NTN device 502 and the NTN gateway 504, and an interface 524 may facilitate communication between the base station 506 and the core network 510. The service link 520 and the feeder link 522 may be implemented by a same radio interface (e.g., the NR-Uu interface). The interface 524 may be implemented by the NG interface.

Figure 6:
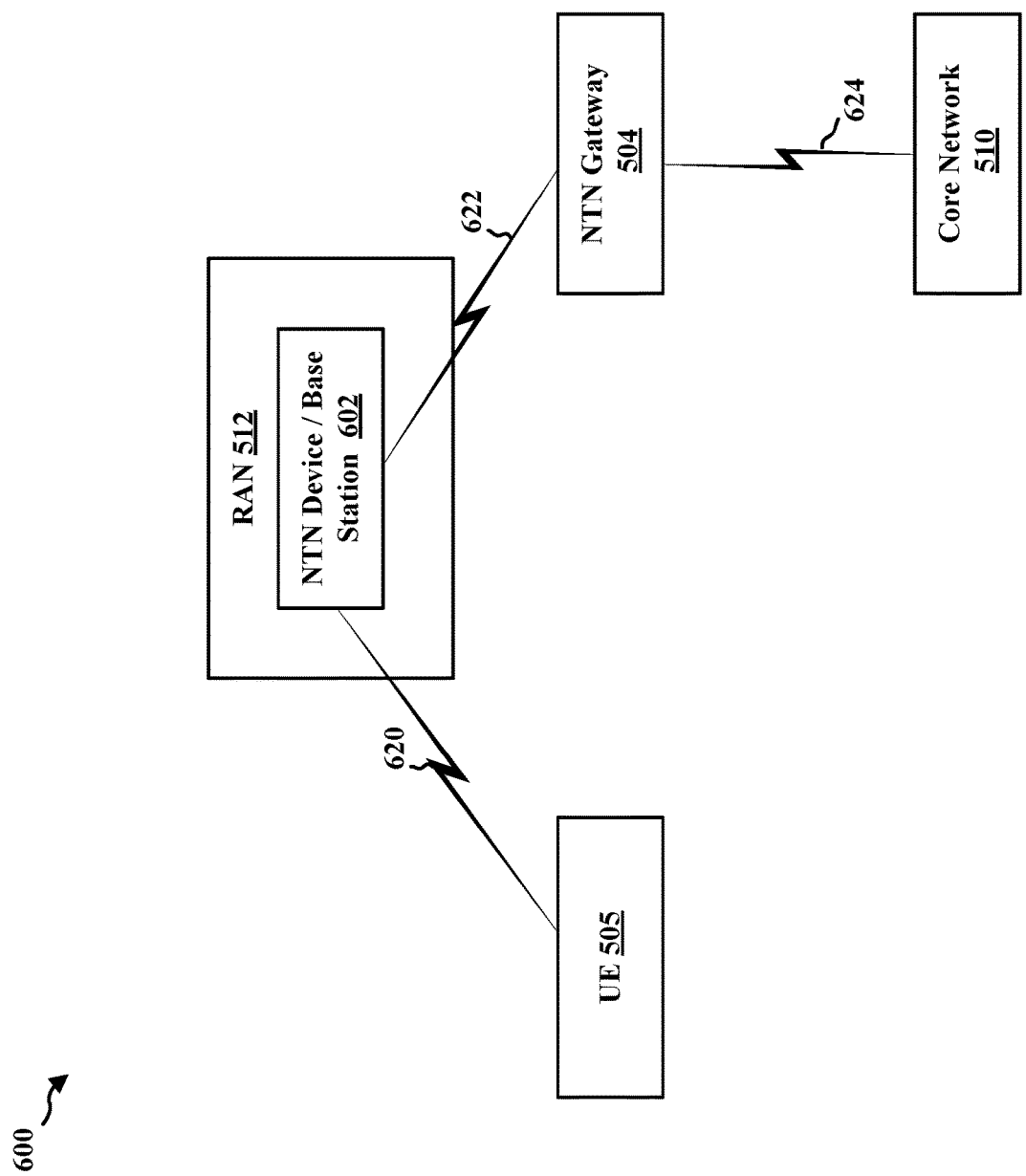
FIG. 6 shows a diagram of another network architecture capable of supporting NTN access, in accordance with various aspects of the present disclosure.

FIG. 6 shows a diagram of a network architecture 600 capable of supporting NTN access, e.g., using 5G NR, as presented herein. The network architecture 600 shown in FIG. 6 is similar to that shown in FIG. 5, like designated elements being similar or the same. FIG. 6, however, illustrates a network architecture with regenerative payloads, as opposed to transparent payloads shown in FIG. 5. A regenerative payload, unlike a transparent payload, includes an on-board base station (e.g., includes the functional capability of a base station), and is referred to herein as an NTN device/base station 602. The on-board base station may correspond to the base station 310 in FIG. 3. The RAN 512 is illustrated as including the NTN device/base station 602. Reference to the NTN device/base station 602 may refer to functions related to communication with the UE 505 and the core network 510 and/or to functions related to communication with the NTN gateway 504 and with the UE 505 at a physical radio frequency level.

An onboard base station may perform many of the same functions as the base station 506 as described previously. For example, the NTN device/base station 602 may terminate the radio interface and associated radio interface protocols to the UE 505 and may transmit DL signals to the UE 505 and receive UL signals from the UE 505, which may include encoding and modulation of transmitted signals and demodulation and decoding of received signals. The NTN device/base station 602 may also support signaling connections and voice and data bearers to the UE 505 and may support handover of the UE 505 between different radio cells for the NTN device/base station 602 and between different NTN device/base stations. The NTN device/base station 602 may assist in the handover (or transfer) of the NTN device/base station 602 between different NTN gateways, different control networks, and between different countries. The NTN device/base station 602 may hide or obscure specific aspects of the NTN device/base station 602 from the core network 510, e.g., by interfacing to the core network 510 in the same way or in a similar way to a terrestrial base station. The NTN device/base station 602 may further assist in sharing of the NTN device/base station 602 over multiple countries. The NTN device/base station 602 may communicate with one or more NTN gateways and with one or more core networks via the NTN gateway 504. In some aspects, the NTN device/base station 602 may communicate directly with other NTN device/base stations using Inter-Satellite Links (ISLs), which may support an Xn interface between any pair of NTN device/base stations.

With LEO devices, the NTN device/base station 602 may manage moving radio cells with coverage in different countries at different times. The NTN gateway 504 may be connected directly to the core network 510, as illustrated. The NTN gateway 504 may be shared by multiple core networks, for example, if NTN gateways are limited. In some examples the core network 510 may need to be aware of coverage area(s) of the NTN device/base station 602 in order to page the UE 505 and to manage handover. Thus, as can be seen, the network architecture 600 with regenerative payloads may have more impact and complexity with respect to both the NTN device/base station 602 and the core network 510 than the network architecture 500 including transparent payloads, as shown in FIG. 5.

Support of regenerative payloads with the network architecture 600 shown in FIG. 6 may impact the network architecture 600 as follows. The core network 510 may be impacted if fixed TAs and fixed cells are not supported, because core components of mobility management and regulatory services, which are based on fixed cells and fixed TAs for terrestrial PLMNs, may be replaced by a new system (e.g., based on a location of the UE 505). If fixed TAs and fixed cells are supported, the core network 510 may map any fixed TA to one or more NTN device/base stations with current radio coverage of the fixed TA when performing paging of the UE 505 that is located in this fixed TA. This could include configuration in the core network 510 of long term orbital data for the NTN device/base station 602 (e.g., obtained from an operator of the NTN device/base station 602) and could add significant new impact to core network 510.

The NTN device/base station 602 may support regulatory and other requirements for multiple countries. A GEO device coverage area may include several or many countries, whereas a LEO device or an MEO device may orbit over many countries. Support of fixed TAs and fixed cells may then include the NTN device/base station 602 configured with fixed TAs and fixed cells for an entire worldwide coverage area. Alternatively, the core network 510 may support fixed TAs and fixed cells for the associated PLMN to reduce complexity of the NTN device/base station 602 and at the expense of more complexity at the core network 510. Additionally, ISLs between NTN device/base stations may change dynamically as relative NTN device/base station 602 positions change.

In the illustrated example of FIG. 6, a service link 620 may facilitate communication between the UE 505 and the NTN device/base station 602, a feeder link 622 may facilitate communication between the NTN device/base station 602 and the NTN gateway 504, and an interface 624 may facilitate communication between the NTN gateway 504 and the core network 510. The service link 620 may be implemented by the NR-Uu interface. The feeder link 622 may be implemented by the NG interface over SRI. The interface 624 may be implemented by the NG interface.

Figure 7:
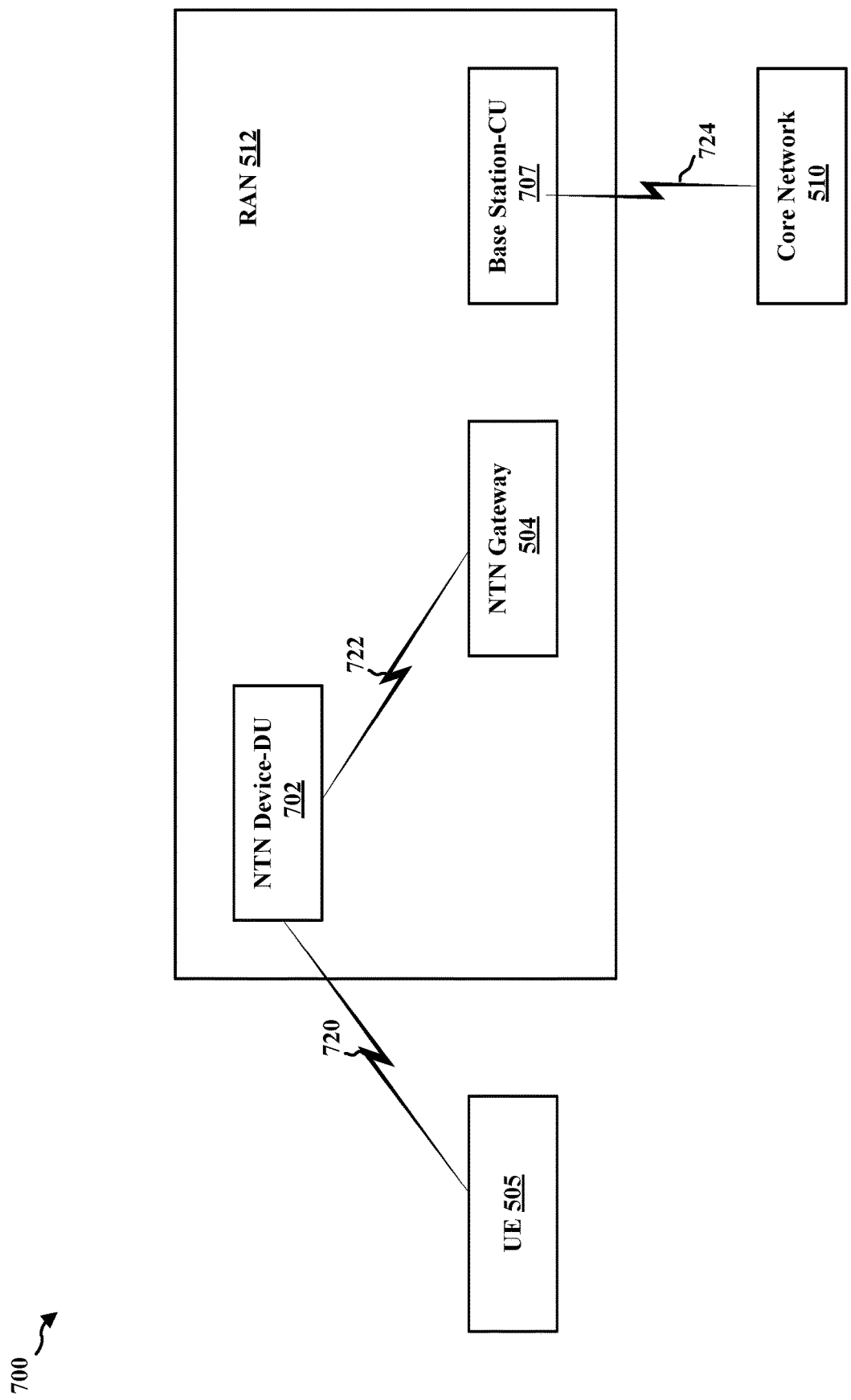
FIG. 7 shows a diagram of another network architecture capable of supporting NTN access, in accordance with various aspects of the present disclosure.

FIG. 7 shows a diagram of a network architecture 700 capable of supporting NTN access, e.g., using 5G NR, as presented herein. The network architecture shown in FIG. 7 is similar to that shown in FIGS. 5 and 6, like designated elements being similar or the same. FIG. 7, however, illustrates a network architecture with regenerative payloads, as opposed to transparent payloads, as shown in FIG. 5, and with a split architecture for the base stations. For example, the base stations may be split between a Central Unit (CU) and a Distributed Unit (DU). In the illustrated example of FIG. 7, the network architecture 700 includes a base station-CU 707, which may be a ground-based base station or a terrestrial base station. The regenerative payloads include an on-board base station DU, and is referred to herein as an NTN device-DU 702. The base station-CU 707 and the NTN device-DU 702, collectively, may correspond to the base station 310 in FIG. 3.

The NTN device-DU 702 communicates with the base station-CU 707 via the NTN gateway 504. The base station-CU 707 together with the NTN device-DU 702 perform functions, and may use internal communication protocols, which are similar to or the same as a gNB with a split architecture. In the example, the NTN device-DU 702 may correspond to and perform functions similar to or the same as a gNB Distributed Unit (gNB-DU), while the base station-CU 707 may correspond to and perform functions similar to or the same as a gNB Central Unit (gNB-CU). However, the base station-CU 707 and the NTN device-DU 702 may each include additional capability to support the UE 505 access using NTN devices.

The NTN device-DU 702 and the base station-CU 707 may communicate with one another using an F1 Application Protocol (F1AP), and together may perform some or all of the same functions as the base station 506 or the NTN device/base station 602 as described in connection with FIGS. 5 and 6, respectively.

The NTN device-DU 702 may terminate the radio interface and associated lower level radio interface protocols to the UE 505 and may transmit DL signals to the UE 505 and receive UL signals from the UE 505, which may include encoding and modulation of transmitted signals and demodulation and decoding of received signals. The operation of the NTN device-DU 702 may be partly controlled by the base station-CU 707. The NTN device-DU 702 may support one or more NR radio cells for the UE 505. The base station-CU 707 may also be split into separate control plane (CP) (base station-CU-CP) and user plane (UP) (base station-CU-UP) portions. The NTN device-DU 702 and the base station-CU 707 may communicate over an F1 interface to (a) support control plane signaling for the UE 505 using IP, Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

The base station-CU 707 may communicate with one or more other base station-CUs and/or with one more other terrestrial base stations using terrestrial links to support an Xn interface between any pair of base station-CUs and/or between the base station-CU 707 and any terrestrial base station.

The NTN device-DU 702 together with the base station-CU 707 may: (i) support signaling connections and voice and data bearers to the UE 505; (ii) support handover of the UE 505 between different radio cells for the NTN device-DU 702 and between different base station-DUs; and (iii) assist in the handover (or transfer) of NTN devices between different NTN gateways, different core networks, and between different countries. The base station-CU 707 may hide or obscure specific aspects of the NTN devices from the core network 510, e.g., by interfacing to the core network 510 in the same way or in a similar way to a terrestrial base station. The base station-CU 707 may further assist in sharing of NTN devices over multiple countries.

In the network architecture 700 of FIG. 7, the NTN device-DU 702 that communicates with and is accessible from a base station-CU may change over time with LEO devices. With the split base station architecture, the core network 510 may connect to NTN device-CUs that are fixed and that do not change over time, which may reduce difficulty with paging of the UE 505. For example, the core network 510 may not need to know which base station-DU is needed for paging the UE 505. The network architecture with regenerative payloads with a split base station architecture may thereby reduce the core network 510 impact at the expense of additional impact to the base station-CU 707.

Support of regenerative payloads with a split base station architecture, as shown in FIG. 7, may impact the network architecture 700 as follows. The impact to the core network 510 may be limited as for the transparent payloads (e.g., the NTN device 502) discussed above. For example, the core network 510 may treat a satellite RAT in the network architecture 700 as a new type of RAT with longer delay, reduced bandwidth and/or higher error rate. The impact on the NTN device-DU 702 may be less than the impact on NTN device/base stations (e.g., the NTN device/base station 602 with a non-split architecture), as discussed above in reference to FIG. 6. The NTN device-DU 702 may manage changing association with different (fixed) base station-CUs. Further, the NTN device-DU 702 may manage radio beams and radio cells. The base station-CU 707 impacts may be similar to the impact of the base station 506 for a network architecture with transparent payloads, as discussed above, except for extra impacts to manage changing associations with different NTN device-DUs and reduced impacts to support radio cells and radio beams, which may be transferred to the NTN device-DU 702.

Figure 8:
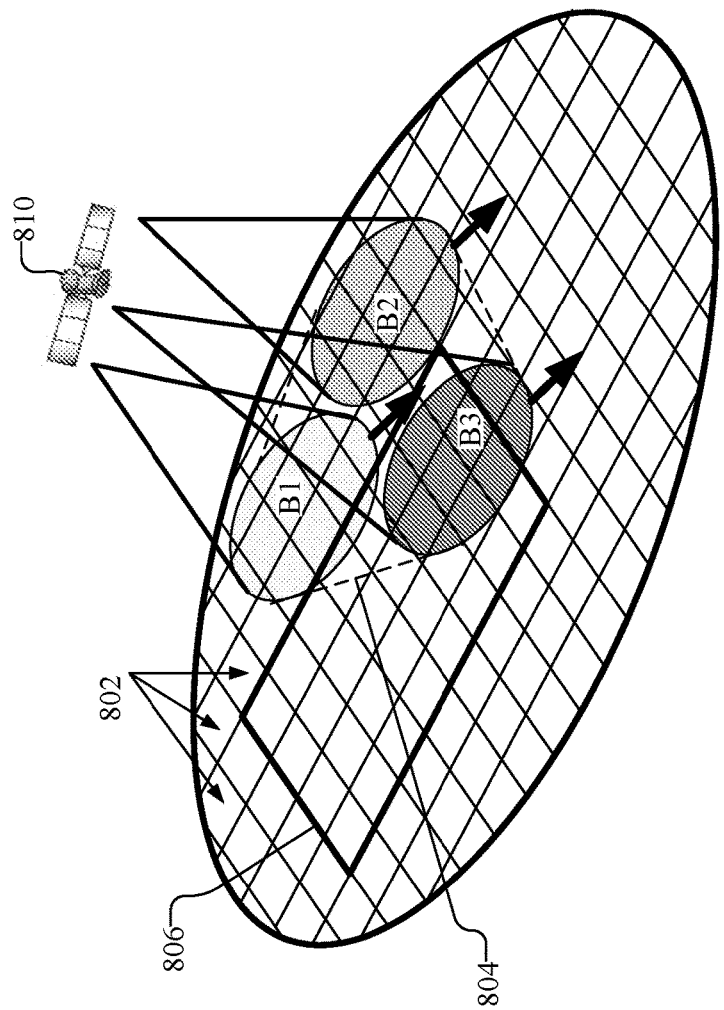
FIG. 8 illustrates radio cells produced by an NTN device over an area that includes a number of Earth-fixed cells, in accordance with various aspects of the present disclosure.

While supporting NTN access to a wireless network, an NTN device may transmit radio beams (also referred to just as "beams"). FIG. 8 illustrates radio cells produced by an NTN device 810 over an area 800 that includes a number of Earth-fixed cells 802, as presented herein. A radio cell may comprise a single beam or multiple beams, e.g., all beams in a radio cell may use the same frequency or a radio cell may comprise one beam for each frequency in a set of different frequencies. For example, beams B1, B2 and B3 may support three separate radio cells (one beam per radio cell) or may collectively support a single radio cell (e.g., a radio cell 804 shown with dotted lines). A radio cell may or may not cover a single contiguous area.

Radio beams and radio cells produced by the NTN device 810 may not align with cells used by terrestrial wireless networks, e.g., NR terrestrial cells or LTE terrestrial cells. For example, in an urban area, a radio beam or radio cell produced by the NTN device 810 may overlap with many terrestrial cells. When supporting NTN access to a wireless network, radio beams and radio cells produced by the NTN device 810 may be hidden from the core network (e.g., the core network 510).

In the example of FIG. 8, there is a cell B1 that may be moving because it is being projected by the NTN device 810. The NTN device 810 could be transparent or a relay for base stations on the ground (e.g., as described in connection with the example of FIG. 5), or the NTN device 810 could be a base station, as described in connection with the examples of FIGS. 6 and/or 7.

In the example of FIG. 8, because the cell B1 is being projected by the NTN device 810, the coverage area of the cell B1 may change over time. That is, at time T1, the cell B1 may be served by the NTN device 810. At a later time (e.g., at time T2), the cell B1 may be turned off and a new cell may be activated. The new cell may be located in the same region as the first cell (e.g., the cell B1). The new cell may be projected by the NTN device 810 or may be projected by a second satellite (e.g., as described in connection with the first NTN device 402 and the third NTN device 406 of FIG. 4).

A UE may be in a connected state (e.g., an "RRC_CONNECTED" state) or an inactive state (e.g., an "RRC_INACTIVE" state) when the UE has established an RRC connection with a base station. If an RRC connection has not been established, the UE is in an idle state (e.g., an "RRC_IDLE" state). While in the idle state, the UE and the base station may establish an RRC connection and the UE may transition to the connected state. While in the connected state, the UE and/or the base station may release the RRC connection and the UE may transition to the idle state. In other examples, while in the connected state, the UE and/or the base station may release with suspend the RRC connection and the UE may transition to the inactive state. While in the inactive state, the UE and/or the base station may resume the RRC connection and the UE may transmission to the connected state. In other examples, while in the inactive state, the UE and/or the base station may release the RRC connection and the UE may transition to the idle state.

The RRC protocol includes the broadcast of system information. System information may include NAS common information, information applicable for UEs in an idle state and in an inactive state (e.g., cell (re-)selection parameters, neighboring cell information), and information applicable for UEs in a connected state (e.g., common channel configuration information), and positioning assistance data.

System information may be divided into the MIB and different SIBs. The MIB may be transmitted on a broadcast channel (BCH) with a periodicity, for example, of 80 ms and repetitions made within 80 ms. The MIB may include parameters that are needed to acquire SIB1 from the cell.

The SIB1 may be transmitted on the downlink shared channel (DL-SCH) with a periodicity, for example, of 160 ms and variable transmission repetition periodicity within 160 ms. The SIB1 includes information regarding the availability and scheduling (e.g., mapping of SIBs to SI message, periodicity, SI-window size) of other SIBs with an indication whether one or more SIBs are only provided on-demand and, in that case, the configuration needed by the UE to perform the SI request. A SIB1 may be a cell-specific SIB.

SIBs other than SIB1 are carried in system information (SI) messages, which are transmitted on the DL-SCH. SIBs having the same periodicity can be mapped to the same SI message. SIBs may be mapped to different SI messages. Each SI message may be transmitted within periodically occurring time domain windows (referred to as SI-windows with same length for all SI messages). Each SI message may be associated with an SI-window and the SI-windows of different SI messages may be non-overlapping. That is, within one SI-window only the corresponding SI message is transmitted. An SI message may be transmitted a number of times within the SI-window. Any SIB except SIB1 can be configured to be cell specific or area specific, using an indication in SIB1.

The mapping of SIBs to SI messages may be configured via a scheduling information list (e.g., which may be referred to as "schedulingInfoList" or by another name) information element. An information element may include a structure element containing single or multiple fields. Each SIB may be contained in a single SI message. Each SIB may be contained at most once in that SI message.

When communicating in an NTN system, the UE may also acquire additional information to facilitate communication with the NTN device (sometimes referred to herein as a satellite). For example, the additional information may include satellite ephemeris, which provides the UE data regarding the satellite, such as where the satellite is located, the velocity of the satellite, the distance to the satellite, etc., so that the UE is able to track the movement of the satellite.

In some examples, multiple satellites may serve a cell. For example, when a first satellite moves, a second satellite may take its place. That is, there may be multiple satellite serving the cell B1 of FIG. 8. The multiple satellites serving the cell B1 may be referred to as a constellation of satellites. Additionally, there may be multiple constellations serving different cells or coverage areas.

For example, and referring again to the example of FIG. 8, at a time T1, the UE and the cell B1 may be covered by the NTN device 810. At a time T2, the UE and the cell B1 may be covered by a second satellite that is part of a same constellation as the NTN device 810. That is, the UE may be communicating with a different satellite at different times while located in the same cell B1. The quantity of satellites included in a constellation may depend on the orbiting parameters of the constellation.

In some examples, the satellite information may be broadcast via system information by the network. Aspects disclosed herein facilitate NTN-specific system information that may contain satellite-specific information. The satellite-specific information (also referred to as "ephemeris") may include information to enable a UE to estimate satellite state vectors. For example, the UE may calculate a satellite position and velocity based on the ephemeris. A satellite may also be associated with beam information. For example, each satellite may project one or more beams to facilitate the coverage area. The beam information may include information regarding the size of the beam, information regarding the center of the beam, etc. Thus, the NTN-specific system information may also include beam-specific information.

The satellite information and the beam information may be specific to particular satellites. However, there may be multiple satellites in a constellation. There may also be neighboring constellations, each of which may also include one or more satellites. In some examples, there may be inter-frequency satellites and/or inter-RAT satellites serving the coverage area. In such examples, the network may broadcast the satellite information for the neighboring satellites, the inter-frequency satellites, the inter-RAT satellites, and/or the other satellites of the constellation (sometimes referred to as "future" satellites).

The network may broadcast the information for the different satellites so that the UEs within a coverage area are able to maintain communication while located within the coverage area, which may result in overhead for each broadcast of system information due to, for example, the quantity of satellites that may be available. Thus, it may be beneficial to reduce the amount of information that the network broadcasts related to the NTN-specific system information (NTN-SI).

Aspects disclosed herein provide techniques for providing on-demand NTN-SI. For example, the network may indicate to the UE that the network will forego broadcasting NTN-SI. The UE may then request the NTN-SI via on-demand procedures. After the network receives the request for the NTN-SI, the network may begin broadcasting the requested NTN-SI. In some examples, the network may unicast or multicast the requested NTN-SI. As used herein, the term "NTN-SI" may include an NTN SIB, satellite information associated with at least one NTN device (e.g., a requested communication satellite), and/or beam information associated with at least one NTN device.

In some examples, the UE may request the NTN-SI while operating in a connected state. For example, while operating in a connected state, the UE may transmit an RRC message requesting dedicated SIBs. For example, the UE may transmit an NTN SIB request message (e.g., which may be referred to as a "DedicatedSIBRequest" message or by another name) that requests NTN-SI. The UE may transmit the NTN SIB request message via an uplink dedicated control channel (UL-DCCH). The network may provide the NTN-SI via an NTN SIB (e.g., which may be referred to as a "SIBNTN" or by another name). In such examples, the response by the network may include the requested NTN-SI.

While operating in an idle state, a UE may have the ability to determine that the network is not transmitting particular system information. For example, the UE may receive a SIB1 including system information scheduling information (e.g., which may be referred to as a "si-SchedulingInfo" information element or by another name). The system information scheduling information may indicate system information that is set to not broadcast. For example, the system information scheduling information may include different system information with a broadcast status (e.g., which may be referred to as "si-BroadcastStatus" or by another name) that may be set to a value indicating that the respective system information is not being broadcast (e.g., which may be referred to as "notBroadcasting" or by another name).

Aspects disclosed herein provide techniques for enabling a UE to request the NTN-SI while operating in an idle state via a random access procedure and/or using an RRC system information request message. For example, the UE may transmit a physical random access channel (PRACH) preamble while performing a random access procedure. The PRACH preamble may map to the NTN-SI when the NTN-SI is indicated as not being broadcasted. The network may then start broadcasting the NTN-SI after receiving the PRACH preamble. In other examples, the UE may transmit an RRC system information request message (e.g., which may be referred to as an "RRCSystemInfoRequest" message or by another name) and indicate that the UE is requesting the NTN-SI. In such examples, the response by the network may include an acknowledgement that the requested NTN-SI may be broadcast and, thus, subsequently acquired by the UE.

In some examples, the NTN-SI may include information for a particular satellite. In some examples, the NTN-SI may include information for other satellites, such as newly discovered satellites, neighboring satellites, and/or future satellites. Such NTN-SI may help perform cell selection/reselection procedures, measurement handling, and/or time/frequency synchronization procedures.

For example, for a particular satellite group (e.g., a constellation), the network may forego providing NTN-SI. In such examples, a UE may be unable to determine the satellite position, or the cell coverage associated with the satellite (e.g., the size of the coverage area, if the cell moving or fixed for a period, a minimum elevation angle, etc.) without the NTN-SI. Aspects disclosed herein facilitate the UE requesting the NTN-SI including satellite information for the satellite.

In some examples, the location of the UE may be unknown to the network. In some such examples, the UE may have the ability to determine which satellite (or constellation) is serving the location of the UE. Aspects disclosed herein facilitate the UE requesting the NTN-SI for the particular satellite (or constellation). In such examples, the network may start broadcasting the NTN-SI for the particular satellite (or constellation). In additional or alternative examples, the network may provide the NTN-SI for the particular satellite (or constellation) to the requesting UE instead of broadcasting the NTN-SI.

Figure 9:
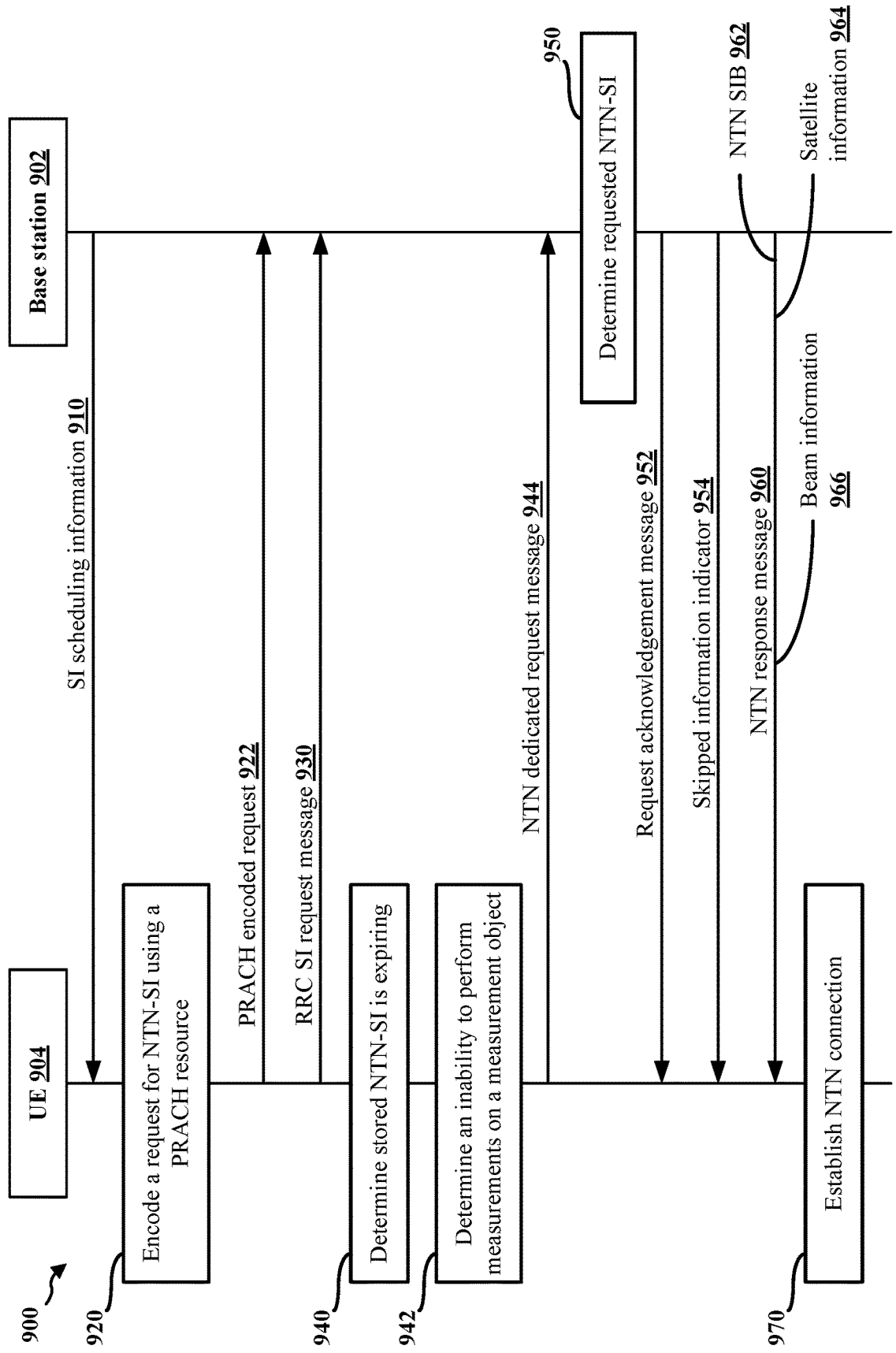
FIG. 9 is an example communication flow between a base station and a UE, in accordance with the teachings disclosed herein.

FIG. 9 illustrates an example communication flow 900 between a base station 902 and a UE 904, as presented herein. In the illustrated example, the communication flow 900 facilitates the UE 904 requesting NTN-specific system information, such as an NTN SIB, satellite information associated with at least one requested communication satellite, and/or beam information associated with at least one requested communication satellite. Aspects of the base station 902 may be implemented by the base station 102/180 of FIG. 1, the base station 310 of FIG. 3, the base station 506 of FIG. 5, the NTN device/base station 602 of FIG. 6, and/or the NTN device-DU 702 and the base station-CU 707 of FIG. 7. Aspects of the UE 904 may be implemented by the UE 104 of FIG. 1, the UE 350 of FIG. 3, the UE 430 of FIG. 4, and/or the UE 505 of FIGS. 5, 6, and/or 7. Although not shown in the illustrated example of FIG. 9, in additional or alternative examples, the base station 902 may be in communication with one or more other base stations or UEs, and/or the UE 904 may be in communication with one or more other base stations or UEs.

In some examples, communication between the base station 902 and the UE 904 may be implemented via a terrestrial network. In some such examples, the UE 904 may request the NTN-specific system information to determine whether to establish a connection with an NTN (e.g., to establish a connection with a communication satellite).

In some examples, the communication between the base station 902 and the UE 904 may be implemented via an NTN. In some such examples, the UE 904 may request the NTN-specific system information to facilitate cell selection, cell reselection, and/or to update stored NTN-SI. Although not shown in the illustrated example of FIG. 9, it may be appreciated that when the communication between the base station 902 and the UE 904 is implemented via an NTN, a communication satellite may relay communications between the base station 902 and the UE 904 (e.g., as described in connection with FIG. 5) or the communication satellite may be configured with base station functionality (e.g., as described in connection with FIGS. 6 and/or 7).

In the illustrated example of FIG. 9, the base station 902 may transmit SI scheduling information 910 that is received by the UE 904. The base station 902 may transmit the SI scheduling information 910 via a SIB1 message. The base station 902 may transmit the SI scheduling information 910 via a downlink shared channel (DL-SCH).

The SI scheduling information 910 may include a list of SI messages and/or a resource configuration. For example, FIG. 10A illustrates example SI scheduling information 1000, as presented herein. In the illustrated example of FIG. 10A, the SI scheduling information 1000 (e.g., which may be referred to as "si-schedulingInfo" or by another name) includes a scheduling information list 1002 and resource configuration 1004. The scheduling information list 1002 (e.g., which may be referred to as "schedulingInfoList" or by another name) may include a sequence or listing of SI messages. For example, the scheduling information list 1002 of FIG. 10A includes N SI messages (e.g., "SI-Message-1," to "SI-Message-N"). As shown in FIG. 10A, the scheduling information list 1002 includes an NTN-SI message 1006 that may provide system information related to NTN (e.g., NTN-specification information or NTN-related information). For example, the NTN-SI message 1006 may include satellite information regarding a communication satellite and/or beam information regarding one or more beams associated with a communication satellite.

The satellite information may include ephemeris that contains information about the orbit of the satellite and/or time of validity of the orbit information. The UE 904 may use the ephemeris to predict the satellite state over a future interval. For example, the satellite state prediction may include a satellite position (e.g., x, y, z coordinates) and/or a velocity of the satellite. In some examples, the satellite information may include location information of the satellite, such as Earth-centered, Earth-fixed coordinates. In some examples, the satellite information may include orbital parameters associated with satellite, such as one or more of a semi-major axis, eccentricity, inclination, right ascension of an ascending node, argument of periapsis, mean anomaly at a reference point in time, and an epoch. The satellite information may additionally, or alternatively, include information about a quantity of beams that a satellite is projecting and/or whether the projected beams have the same properties. The satellite information may be indexed to a satellite identifier. In some examples, the satellite identifier may identify a grouping of satellites serving a coverage area (e.g., a satellite constellation). In some examples, the satellite identifier may identify a group of satellites (e.g., based on identifiers and/or frequencies). In some examples, the satellite identifier may identify a current serving satellite and/or a future serving satellite. For example, the satellite identifier may be based on a tracking area identifier, a tracking zone identifier, a virtual cell identifier, and/or a UE location.

The beam information may include information regarding one or more beams projected by a satellite. For example, the beam information may indicate whether the one or more beams are fixed-beams (e.g., beams that are steered towards an area of earth as long as possible) or moving-beams (e.g., beams that move over the surface of the earth following the motion of the satellite). The beam information may also indicate a beam footprint size, a center of a beam, and/or an elevation angle associated with the beam. The beam information may be indexed to a beam identifier.

As shown in FIG. 10A, each SI message of the scheduling information list 1002 may be associated with one or more fields. For example, the NTN-SI message 1006 includes a broadcast status 1008 and a SIB type 1010. The broadcast status 1008 may be set to a first indicator to indicate that the respective SI message is being broadcast or may be set to a second indicator to indicate that the respective SI message is not being broadcast. The SIB type 1010 may indicate the type of SIB associated with the SI message. In the illustrated example of FIG. 10A, the broadcast status 1008 of the NTN-SI message 1006 indicates that the NTN-SI message 1006 is not being broadcast and the SIB type 1010 indicates that the NTN-SI message 1006 is an NTN SIB (e.g., which may be referred to as "SIBNTN" or by another name).

The SI scheduling information 1000 may additionally, or alternatively, include the resource configuration 1004 (e.g., which may be referred to as "si-RequestConfig" or by another name) that includes configuration information of MSG1 resources associated with a random access procedure. For example, the configuration information may include physical random access channel (PRACH) resources and/or PRACH preambles. In some examples, the PRACH resources may map to respective SI messages of the list of SI messages. For example, the example NTN-SI message 1006 of FIG. 10A maps to an NTN PRACH resource 1012 ("NTN-PRACH-resource"). The NTN PRACH resource 1012 may be used to encode a request for NTN-SI.

Although the example SI scheduling information 1000 includes the scheduling information list 1002 and the resource configuration 1004, other examples may include additional or alternate fields associated with SI messages.

Referring again to the example communication flow 900 of FIG. 9, at 920, the UE 904 may encode a request for NTN-SI using a PRACH resource. For example, the UE 904 may use the NTN PRACH resource 1012 to encode a request for the NTN-SI message 1006. The UE 904 may then transmit a request for NTN-SI. For example, the UE 904 may transmit a PRACH encoded request 922 that is received by the base station 902. The UE 904 may transmit the PRACH encoded request 922 while operating in an idle state. In some examples, the UE 904 may transmit the PRACH encoded request 922 while performing a random access procedure.

At 950, the base station 902 may determine the requested NTN-SI. In some examples, the base station 902 may determine the requested NTN-SI based on the PRACH encoded request 922. For example, the base station 902 may decode the PRACH encoded request 922 based on the resource configuration 1004 of the SI scheduling information 1000 of FIG. 10A. Using the PRACH resource used to encode the PRACH encoded request 922, the base station 902 may determine that the UE 904 is requesting an NTN-SI message (e.g., the NTN-SI message 1006 of FIG. 10A). In some examples, the UE 904 may request an SI message that is not being broadcast. For example, the broadcast status 1008 of the NTN-SI message 1006 indicates that the NTN-SI message 1006 is not being broadcast and, thus, the PRACH encoded request 922 may request the NTN-SI message 1006.

In the illustrated example of FIG. 9, the base station 902 may transmit a request acknowledgement message 952 that is received by the UE 904. In some examples, the base station 902 may transmit the request acknowledgement message 952 via a random access response (RAR) message. The base station 902 may transmit the RAR message as part of a random access procedure with the UE 904.

The request acknowledgement message 952 may indicate that the base station 902 will broadcast the requested NTN-SI and, thus, that the UE 904 may acquire the requested NTN-SI. In some examples, the requested NTN-SI may include information that is unavailable to the base station 902. For example, the requested NTN-SI may indicate a group of satellites including one or more communication satellites that are associated with a different operator. In such examples, the request acknowledgement message 952 may indicate that the base station 902 will broadcast a subset of the requested NTN-SI. The base station 902 may also transmit a skipped information indicator 954 indicating the requested NTN-SI that the base station 902 will not broadcast (e.g., due to information being unavailable to the base station 902). The base station 902 may transmit the skipped information indicator 954 with the request acknowledgement message 952 and/or as a separate message to the UE 904.

As shown in FIG. 9, the base station 902 transmits an NTN response message 960 that is received by the UE 904. The NTN response message 960 may include one or more SIBs, such as the requested NTN-SI. For example, the NTN response message 960 may include an NTN SIB 962 (e.g., which may be referred to as "SIBNTN" or by another name), satellite information 964, and/or beam information 966.

The satellite information 964 may be associated with a current serving satellite and/or a future satellite. The beam information 966 may be associated with one or more beams associate with a current serving satellite and/or a future satellite. The NTN SIB 962 may include the satellite information 964 and/or the beam information 966 associated with the current serving satellite and/or a future satellite. For example, the UE 904 may request NTN-SI for a satellite constellation to perform a cell reselection procedure. In such examples, the NTN response message 960 may include the satellite information 964 and the beam information 966 corresponding to the respective satellites. In some examples, the UE 904 may request information for a particular satellite(s) (e.g., via a satellite identifier(s)) and/or a particular beam(s) associated with the particular satellite(s) (e.g., via a beam identifier(s)). In such examples, the NTN response message 960 may include the satellite information 964 associated with the satellite identifier(s) (e.g., satellite-specific SI) and/or the beam information 966 associated with the beam identifier(s) (e.g., beam-specific SI).

In some examples, the UE 904 may transmit the request for the NTN-SI via an uplink common control channel (e.g., an UL CCCH-based SI request). For example, the UE 904 may transmit an RRC SI request message 930 that is received by the base station 902. The RRC SI request message 930 may facilitate requesting particular SI messages. For example, the UE 904 may transmit the RRC SI request message 930 to request an SI message configured via the SI scheduling information 910, such as the example NTN-SI message 1006 of FIG. 10A.

FIG. 10B illustrates an example RRC SI request message 1020, as presented herein. The RRC SI request message 1020 may enable the UE 904 to request one or more particular SI messages. In the illustrated example of FIG. 10B, the RRC SI request message 1020 (e.g., which may be referred to as "RRCSystemInfoRequest" or by another name) includes a critical extension function 1022, a requested SI list 1024, a requested satellite information identifier 1026, a requested beam information identifier 1028, and a requested indexing flag 1030. However, other example RRC SI request messages may include additional or alternative information.

The critical extension function 1022 may enable the message (e.g., the RRC SI request message 1020) to be extended. The critical extension function 1022 may include one or more techniques to indicate a requested SI message, requested satellite information, and/or requested beam information.

The requested SI list 1024 (e.g., which may be referred to as "requested-SI-List" or by another name) may include a listing of one or more requested SI messages. In some examples, the listing of the one or more requested SI messages may be indexed based on the order of entry in the scheduling information list 1002 of the SI scheduling information 1000 of FIG. 10A. In some examples, the UE 904 may use a first indicator (e.g., a "1") to indicate that the respective SI message is requested and may use a second indicator (e.g., a "0") to indicate that the respective SI message is not being requested. For example, and with respect to the scheduling information list 1002 of FIG. 10A, a first entry of the requested SI list 1024 may correspond to the first SI message ("SI-Message-1"), a second entry of the requested SI list 1024 may correspond to the NTN-SI message 1006, . . . , and an Nth entry of the requested SI list 1024 may correspond to the Nth SI message ("SI-Message-N"). The UE 904 may set the second entry of the requested SI list 1024 using the first indicator ("1") to indicate that the UE 904 is requesting the NTN-SI message 1006. In some examples, the listing of the one or more requested SI messages may be indexed based on the order of entry in the scheduling information list 1002 of the SI scheduling information 1000 having a broadcast status set to not broadcasting. That is, in such examples, the UE 904 may be configured to request SI messages that are indicated as not being broadcast by the base station 902.

As described above, in some examples, the UE 904 may request NTN-SI via an NTN SIB. In some examples, the UE 904 may request NTN-SI for a particular satellite(s) and/or a particular beam(s). In some such examples, the RRC SI request message 1020 may include the requested satellite information identifier 1026 and/or the requested beam information identifier 1028. The requested satellite information identifier 1026 (e.g., which may be referred to as "requested-SatelliteInfo" or by another name) may indicate one or more satellites (e.g., a grouping of satellites). The requested beam information identifier 1028 (e.g., which may be referred to as "requested-BeamInfo" or by another name) may indicate one or more beams. In some examples, the requested satellite information identifier 1026 and/or the requested beam information identifier 1028 may be included in the requested SI list 1024. In some examples, the requested satellite information identifier 1026 and/or the requested beam information identifier 1028 may be included in the RRC SI request message 1020, but separate from the requested SI list 1024.

In some examples, the RRC SI request message 1020 may include the requested indexing flag 1030 to indicate whether the request is associated with an SI message or with satellite/beam information. For example, the UE 904 may set the requested indexing flag 1030 to a first value (e.g., a "0") to indicate that the RRC SI request message 1020 includes a request for an SI message, and may set the requested indexing flag 1030 to a second value (e.g., a "1") to indicate that the RRC SI request message 1020 includes a request for satellite information and/or beam information. In such examples, the value of the requested indexing flag 1030 may indicate whether the entries of the requested SI list 1024 correspond to SI messages or to satellite/beam information. For example, when the requested indexing flag 1030 is set to the first value ("0"), the second entry of the requested SI list 1024 may correspond to the NTN-SI message 1006, and when the requested indexing flag 1030 is set to the second value ("1"), the second entry of the requested SI list 1024 may correspond to a second satellite or to a second beam.

Referring again to the example communication flow 900 of FIG. 9, after the base station 902 receives the RRC SI request message 930, the base station 902 determines the requested NTN-SI (e.g., at 950). For example, the base station 902 may use the indicators of the requested SI list 1024 to determine the SI messages being requested by the RRC SI request message 930. In some examples, the base station 902 may use the requested satellite information identifier 1026 to determine the satellite information being requested by the RRC SI request message 930. In some examples, the base station 902 may use the requested beam information identifier 1028 to determine the beam information being requested by the RRC SI request message 930. In some examples, the RRC SI request message 930 may include a flag (e.g., the requested indexing flag 1030) to indicate, for example, whether the entries of the requested SI list 1024 map to SI messages or to satellite/beam information.

Similar to the above example in which the UE 904 transmit the request for the NTN-SI via a random access procedure (e.g., via the PRACH encoded request 922), the base station 902 may transmit a request acknowledgement message 952 to indicate that the base station 902 will broadcast the requested NTN-SI. In some examples, the requested NTN-SI may include information that is unavailable to the base station 902. For example, the base station 902 may transmit the skipped information indicator 954 with the request acknowledgement message 952 and/or as a separate message to the UE 904.

The base station 902 may transmit the NTN response message 960 that is received by the UE 904. The NTN response message 960 may include the NTN-SI requested by the UE 904 via the RRC SI request message 930 and determined by the base station 902 (e.g., at 950). For example, the NTN response message 960 may include the NTN SIB 962 when the RRC SI request message 930 indicates an SI message (e.g., the NTN-SI message 1006), may include the satellite information 964 when the RRC SI request message 930 includes a satellite identifier (e.g., the requested satellite information identifier 1026), and/or may include the beam information 966 when the RRC SI request message 930 includes a beam identifier (e.g., the requested beam information identifier 1028).

In the above examples in which the UE 904 requests the NTN-SI via a random access procedure (e.g., via the PRACH encoded request 922) and/or the uplink common control channel (e.g., via the RRC SI request message 930), the UE 904 may transmit the request while operating in an idle state. In such examples, the response by the base station 902 may include an acknowledgement that at least a portion of the requested NTN-SI may be acquired by the UE 904. In some examples, the UE 904 may transmit a request for NTN-SI while operating in a connected state. For example, the UE 904 may transmit an NTN dedicated request message 944 that is received by the base station 902. The UE 904 may transmit the NTN dedicated request message 944 via dedicated signaling, such as an uplink dedicated control channel (UL DCCH). Similar to the RRC SI request message 930, the UE 904 may transmit the NTN dedicated request message 944 to request an NTN SIB (e.g., the NTN SIB 962), to request satellite information (e.g., the satellite information 964), and/or to request beam information (e.g., the beam information 966).

For example, FIG. 10C illustrates an example NTN dedicated request message 1040, as presented herein. The example NTN dedicated request message 1040 may be used to request SIBs while operating in a connected state (e.g., an RRC_CONNECTED state). In the illustrated example of FIG. 10C, the NTN dedicated request message 1040 (e.g., which may be referred to as "DedicatedSIBRequest" or by another name) includes a requested SIB list 1042, a requested satellite information identifier 1044, and a requested beam information identifier 1046. However, other example NTN dedicated request messages may include additional or alternative fields.

The example requested SIB list 1042 (e.g., which may be referred to as "requestedSIB-List" or by another name) may include a listing of one or more SIBS that the UE 904 is requesting. In some examples, entries of the requested SIB list 1042 may index to respective SIBs. For example, an entry of the requested SIB list 1042 may correspond to the NTN SIB 962.

As described above, in some examples, the UE 904 may request NTN-SI for a particular satellite(s) and/or a particular beam(s). In some such examples, the NTN dedicated request message 1040 may include the requested satellite information identifier 1044 and/or the requested beam information identifier 1046. The requested satellite information identifier 1044 may indicate one or more satellites (e.g., a grouping of satellites). The requested beam information identifier 1046 may indicate one or more beams. In some examples, the requested satellite information identifier 1044 and/or the requested beam information identifier 1046 may be included in the requested SIB list 1042. In some examples, the requested satellite information identifier 1044 and/or the requested beam information identifier 1046 may be included in the NTN dedicated request message 1040, but separate from the requested SIB list 1042.

Referring again to the example communication flow 900 of FIG. 9, after the base station 902 receives the NTN dedicated request message 944, the base station 902 determines the requested NTN-SI (e.g., at 950). For example, the base station 902 may use the requested SIB list 1042 to determine the SIBs being requested by the NTN dedicated request message 944. In some examples, the base station 902 may use the requested satellite information identifier 1044 to determine the satellite information being requested by the NTN dedicated request message 944. In some examples, the base station 902 may use the requested beam information identifier 1046 to determine the beam information being requested by the NTN dedicated request message 944.

The base station 902 may transmit the request acknowledgement message 952 and/or the skipped information indicator 954 to indicate information that the base station 902 may provide or be unable to provide to the UE 904.

The base station 902 may transmit the NTN response message 960 that is received by the UE 904. The NTN response message 960 may include the NTN-SI requested by the UE 904 via the NTN dedicated request message 944 and determined by the base station 902 (e.g., at 950). For example, the NTN response message 960 may include the NTN SIB 962 when the NTN dedicated request message 944 indicates an NTN SIB, may include the satellite information 964 when the NTN dedicated request message 944 includes a satellite identifier (e.g., the requested satellite information identifier 1044), and/or may include the beam information 966 when the NTN dedicated request message 944 includes a beam identifier (e.g., the requested beam information identifier 1046).

In the above examples in which the UE 904 requests the NTN-SI via a random access procedure (e.g., via the PRACH encoded request 922) and/or the uplink common control channel (e.g., via the RRC SI request message 930), the UE 904 may transmit the request while operating in an idle state. The UE 904 may transmit the requests for the NTN-SI to facilitate cell selection procedures and/or cell reselection procedures. In some examples, the UE 904 may also transmit a request for NTN-SI based on the occurrence of a triggering event. For example, the UE 904 may detect the occurrence of a triggering event while operating in the connected state.

In some examples, the occurrence of a triggering event may be based on a validity of previously received NTN-SI. For example, previously received NTN-SI may be valid for a period (e.g., two hours, three hours, etc.). In such examples, when the validity of the previously received NTN-SI is expiring, the UE 904 may detect the occurrence of a triggering event. For example, at 940, the UE 904 may determine that stored NTN-SI is expiring and, thus, determine to transmit a request for NTN-SI (e.g., the NTN dedicated request message 944).

In some examples in which the UE 904 transmits the request for the NTN-SI based on expiring validity of satellite information (e.g., at 940), the UE 904 may transmit the NTN dedicated request message 944 with at least a satellite identifier associated with the expiring satellite information. For example, the UE 904 may determine, at 940, that satellite information associated with a first satellite is expiring. In such examples, the UE 904 may include a satellite identifier associated with the first satellite (e.g., the requested satellite information identifier 1044) to acquire updated satellite information for the first satellite.

In some examples, the occurrence of a triggering event may be based on an inability to perform a measurement. For example, while in the connected state, the UE 904 may be configured to perform measurements on a measurement object, such as a reference signal associated with a communication satellite. In some such examples, the UE 904 may be unable to perform a measurement on the measurement object. For example, the UE 904 may be unable to locate the communication satellite (e.g., due to incorrect satellite information, due to expired satellite information, etc.). In such examples, when the UE 904 is unable to perform the measurement on the measurement object, the UE 904 may detect the occurrence of a triggering event. For example, at 942, the UE 904 may determine the inability to perform measurements on the measurement object and, thus, determine to transmit a request for NTN-SI (e.g., the NTN dedicated request message 944).

In some examples in which the UE 904 transmits the request for the NTN-SI based on an inability to perform a measurement (e.g., at 942), the UE 904 may transmit the NTN dedicated request message 944 with at least a satellite identifier and/or a beam identifier associated with measurement object. For example, the UE 904 may determine, at 942, that the UE 904 is unable to locate a first beam associated with a first satellite. In such examples, the UE 904 may include a satellite identifier associated with the first satellite (e.g., the requested satellite information identifier 1044) to acquire new satellite information associated with the first satellite and/or may include a beam identifier associated with the first beam (e.g., the requested beam information identifier 1046) to acquire new beam information associated with the first beam.

As described above, in some examples, the communication between the base station 902 and the UE 904 may be implemented via an NTN. In some such examples, the UE 904 may request the NTN-specific system information to facilitate cell selection, cell reselection, and/or to update stored NTN-SI. In other examples, the communication between the base station 902 and the UE 904 may be implemented via a terrestrial network. In some such examples, the UE 904 may request the NTN-specific SI to determine whether to establish a connection with an NTN (e.g., to establish a connection with a communication satellite). For example, after receiving the NTN response message 960, at 970, the UE 904 may establish an NTN connection via a communication satellite.

Figure 11:
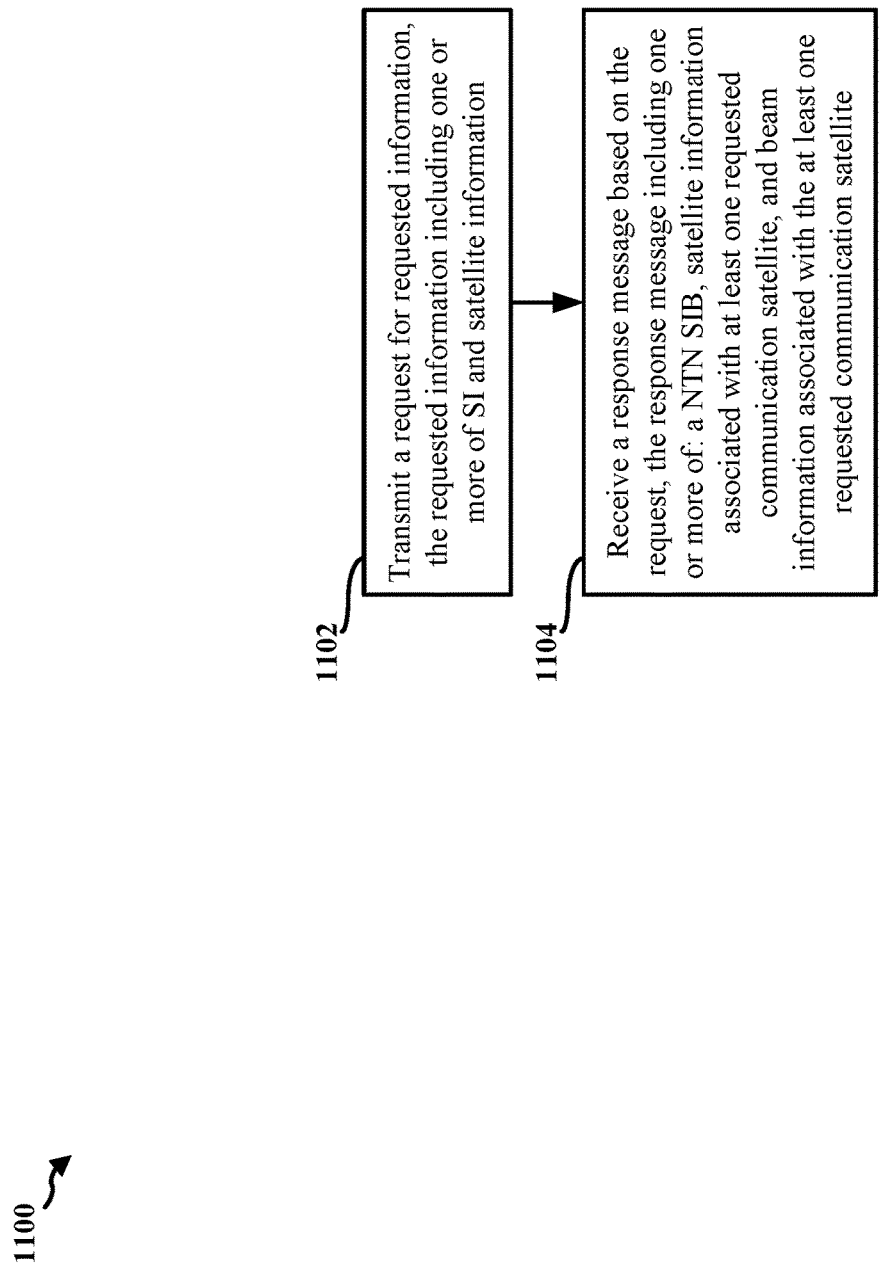
FIG. 11 is a flowchart of a method of wireless communication at a UE, in accordance with the teachings disclosed herein.

FIG. 11 is a flowchart 1100 of a method of wireless communication. The method may be performed by a UE (e.g., the UE 104, the UE 350, the UE 904, and/or an apparatus 1302 of FIG. 13). The method may facilitate improving cell coverage and/or increased throughput by enabling a UE to request NTN-specific system information (e.g., an NTN SIB, satellite-specific information, and/or beam-specific information).

At 1102, the UE transmits a request for requested information, the requested information including one or more of SI and satellite information, as described in connection with the PRACH encoded request 922, the RRC SI request message 930, and/or the NTN dedicated request message 944 of FIG. 9. The request for the requested information may include a request for NTN-specific information, for satellite information associated with at least one NTN device, and/or for beam information associated with at least one NTN device. The transmitting of the request, at 1102, may be performed by a request component 1340 of the apparatus 1302 of FIG. 13.

At 1104, the UE receives a response message based on the request, as described in connection with the NTN response message 960 of FIG. 9. The response message may include one or more of an NTN SIB (e.g., which may be referred to as "SIBNTN" or by another name), satellite information associated with at least one requested communication satellite, and beam information associated with the at least one requested communication satellite. In some examples, the satellite information may include one or more of position information associated with the at least one requested communication satellite, velocity information associated with the at least one requested communication satellite, location information of the at least one requested communication satellite (e.g., Earth-centered, Earth-fixed coordinates), orbital parameters associated with the at least one requested communication satellite (e.g., a semi-major axis, eccentricity, inclination, right ascension of an ascending node, argument of periapsis, mean anomaly at a reference point in time, and/or an epoch), a quantity of beams supported by the at least one requested communication satellite, and an indicator indicating shared beam properties associated with the beams supported by the at least one requested communication satellite. In some examples, the beam information may include one or more of a center of at least one beam associated with the at least one requested communication satellite, a size of the at least one beam (e.g., a beam footprint size), an indicator indicating that a cell supported by the at least one beam is fixed, and an elevation associated with the at least one beam. In some examples, the UE may receive the response message via a broadcast channel (BCH). In some examples, the UE may receive the response message via a downlink channel (e.g., a PDCCH or a PDSCH). In some examples, the response message may include an acknowledgement that the requested information is available for acquiring via one or more broadcast system information messages. In some examples, the response message may include a downlink message including the requested information. The receiving of the response message, at 1104, may be performed by a response component 1342 of the apparatus 1302 of FIG. 13.

In some examples, the UE may be communicating with a base station via an NTN. For example, the UE may transmit the request for the requested information (e.g., at 1102) to a base station via a communication satellite. The UE may transmit the request for the requested information to acquire updated NTN-specific system information, to acquire NTN-SI associated with neighboring satellites, and/or to acquire NTN-SI associated with future satellites. The base station may be a terrestrial-based base station, as described in connection with the base station 506 of FIG. 5, may be an NTN device/base station, as described in connection with the NTN device/base station 602 of FIG. 6, or may be a disaggregated base station, as described in connection with the NTN device-DU 702 and the base station-CU 707 of FIG. 7.

In some examples, the UE may be communicating with the base station via a terrestrial network and determine to communicate via an NTN. For example, the UE may transmit the request for the requested information (e.g., at 1102) to a terrestrial network base station. In some such examples, the UE may use the response message (e.g., at 1104) to establish a connection with a communication satellite to facilitate communication with the NTN.

Figure 12:
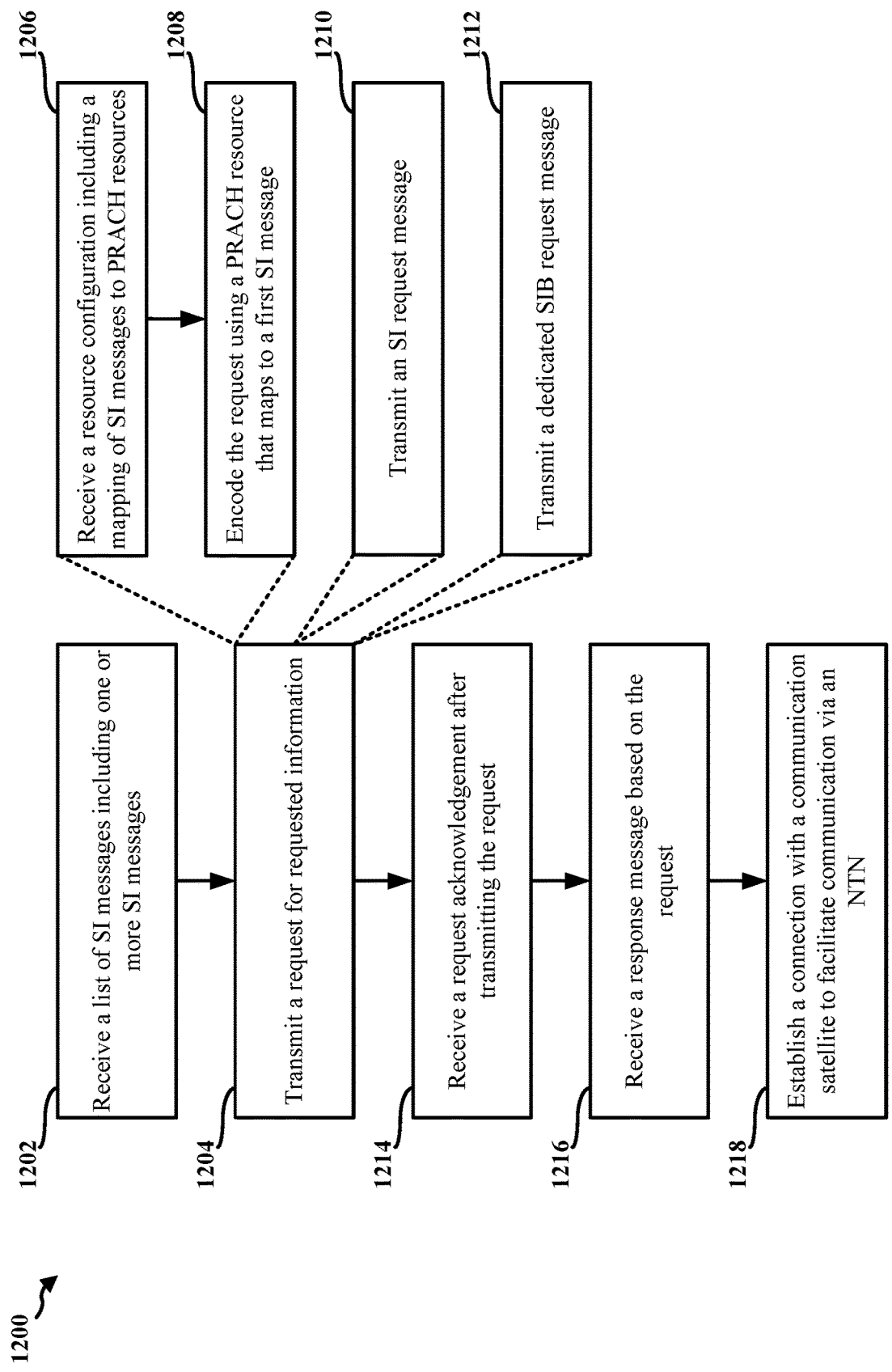
FIG. 12 is a flowchart of a method of wireless communication at a UE, in accordance with the teachings disclosed herein.

FIG. 12 is a flowchart 1200 of a method of wireless communication. The method may be performed by a UE (e.g., the UE 104, the UE 350, the UE 904, and/or an apparatus 1302 of FIG. 13). The method may facilitate improving cell coverage and/or increased throughput by enabling a UE to request NTN-specific system information (e.g., an NTN SIB, satellite-specific information, and/or beam-specific information).

At 1204, the UE transmits a request for requested information, the requested information including one or more of SI and satellite information, as described in connection with the PRACH encoded request 922, the RRC SI request message 930, and/or the NTN dedicated request message 944 of FIG. 9. The request for the requested information may include a request for NTN-specific information, for satellite information associated with at least one NTN device, and/or for beam information associated with at least one NTN device. The transmitting of the request, at 1204, may be performed by a request component 1340 of the apparatus 1302 of FIG. 13.

At 1216, the UE receives a response message based on the request, as described in connection with the NTN response message 960 of FIG. 9. The response message may include one or more of an NTN SIB (e.g., which may be referred to as "SIBNTN" or by another name), satellite information associated with at least one requested communication satellite, and beam information associated with the at least one requested communication satellite. In some examples, the satellite information may include one or more of position information associated with the at least one requested communication satellite, velocity information associated with the at least one requested communication satellite, location information of the at least one requested communication satellite (e.g., Earth-centered, Earth-fixed coordinates), orbital parameters associated with the at least one requested communication satellite (e.g., a semi-major axis, eccentricity, inclination, right ascension of an ascending node, argument of periapsis, mean anomaly at a reference point in time, and/or an epoch), a quantity of beams supported by the at least one requested communication satellite, and an indicator indicating shared beam properties associated with the beams supported by the at least one requested communication satellite. In some examples, the beam information may include one or more of a center of at least one beam associated with the at least one requested communication satellite, a size of the at least one beam (e.g., a beam footprint size), an indicator indicating that a cell supported by the at least one beam is fixed, and an elevation associated with the at least one beam. In some examples, the UE may receive the response message via a broadcast channel (BCH). In some examples, the UE may receive the response message via a downlink channel (e.g., a PDCCH or a PDSCH). In some examples, the response message may include an acknowledgement that the requested information is available for acquiring via one or more broadcast system information messages. In some examples, the response message may include a downlink message including the requested information. The receiving of the response message, at 1216, may be performed by a response component 1342 of the apparatus 1302 of FIG. 13.

In some examples, the UE may be communicating with a base station via an NTN. For example, the UE may transmit the request for the requested information (e.g., at 1204) to a base station via a communication satellite. The UE may transmit the request for the requested information to acquire updated NTN-specific system information, to acquire NTN-SI associated with neighboring satellites, and/or to acquire NTN-SI associated with future satellites. The base station may be a terrestrial-based base station, as described in connection with the base station 506 of FIG. 5, may be an NTN device/base station, as described in connection with the NTN device/base station 602 of FIG. 6, or may be a disaggregated base station, as described in connection with the NTN device-DU 702 and the base station-CU 707 of FIG. 7.

In some examples, the UE may be communicating with the base station via a terrestrial network and determine to communicate via an NTN. For example, the UE may transmit the request for the requested information (e.g., at 1204) to a terrestrial network base station. In some such examples, at 1218, the UE may establish a connection with a communication satellite to facilitate communication via an NTN based in part on the response message, as described in connection with 970 of FIG. 9. The establishing the connection with the communication satellite to facilitate the communication via the NTN, at 1218, may be performed by a connection component 1356 of the apparatus 1302 of FIG. 13.

In some examples, the UE may be configured to request system information for SI messages that are not being broadcast. For example, at 1202, the UE may receive a list of SI messages (e.g., which may be referred to as "schedulingInfoList" or by another name) including one or more SI messages, each SI message of the list of SI messages associated with a broadcast status set to either broadcasting or not broadcast, as described in connection with the SI scheduling information 910 of FIG. 9 and/or the scheduling information list 1002 of FIG. 10A. In some examples, the UE may receive the list of SI messages via a SIB1 message. The receiving of the list of SI messages, at 1202, may be performed by an SI messages list component 1344 of the apparatus 1302 of FIG. 13.

In some examples, the request for the requested information (e.g., at 1204) may indicate a first SI message, the first SI message included in the list of SI messages, the first SI message having the broadcast status set to not broadcasting, and the first SI message carrying at least one of the satellite information and the beam information, as described in connection with the example NTN-SI message 1006 and the broadcast status 1008 of FIG. 10A.

In some examples, the UE may request the requested information while performing a random access procedure. For example, the UE may transmit the request for the requested information while operating in an idle state. In the illustrated example of FIG. 12, at 1206, the UE may receive a resource configuration (e.g., which may be referred to as "si-RequestConfig" or by another name) including a mapping of SI messages of the list of SI messages to respective PRACH resources, as described in connection with the example SI scheduling information 910 of FIG. 9 and/or the example SI scheduling information 1000 of FIG. 10A. In some examples, the UE may receive the resource configuration via a SIB1 message. The receiving of the resource configuration, at 1206, may be performed by a resource configuration component 1346 of the apparatus 1302 of FIG. 13.

At 1208, the UE may encode the request for the requested information using at least one of a first PRACH resource of the resource configuration that maps to the first SI message, or a second PRACH resource of the resource configuration that maps to a group of satellites including the at least one requested communication satellite, as described in connection with 920 of FIG. 9. In some examples, the PRACH resource may include a PRACH preamble. In some examples, a group identity of the group of satellites may be based at least in part on a satellite constellation, a PLMN identity, a frequency, a neighbor satellite list, a tracking area, or a geographical location. The encoding of the request using the PRACH resource, at 1208, may be performed by an encoding component 1348 of the apparatus 1302 of FIG. 13.

In some examples, the UE may transmit the request for the requested information encoded using the PRACH resource while performing the random access procedure, as described in connection with the PRACH encoded request 922 of FIG. 9.

At 1214, the UE may receive a request acknowledgement after transmitting the request, the request acknowledgement indicating one or more broadcasting SI messages scheduled for broadcasting, as described in connection with the request acknowledgement message 952 of FIG. 9. In some examples, the request acknowledgement may further indicate secondary information being skipped, the secondary information being based on the request for the requested information and including information associated with at least one or more groups of satellites, as described in connection with the skipped information indicator 954 of FIG. 9. The receiving of the request acknowledgement, at 1214, may be performed by an acknowledgement component 1350 of the apparatus 1302 of FIG. 13.

In some examples, the UE may receive the response message (e.g., at 1216) while in an idle state, the response message including an SI message identifier, a group of satellites identifier, or a beam identifier of the at least one requested communication satellite. For example, the UE may change to the idle state after receiving the request acknowledgement and monitor for the requested SI.

In some examples, the UE may request the requested information via a control channel SI request. For example, at 1210, the UE may transmit an SI request message (e.g., which may be referred to as "RRCSystemInfoRequest" or by another name) including the request for the requested information, the SI request message including a list of requested SI messages (e.g., which may be referred to as "requested-SI-List" or by another name) including at least the first SI message, as described in connection with the RRC SI request message 930 of FIG. 9, the RRC SI request message 1020 of FIG. 10A, and/or the requested SI list 1024 of FIG. 10B. The UE may transmit the SI request message via an uplink common control channel (UL CCCH). The transmitting of the SI request message, at 1210, may be performed by an SI request message component 1352 of the apparatus 1302 of FIG. 13.

In some examples, the SI request message may include an identifier, as described in connection with the requested satellite information identifier 1026 and/or the requested beam information identifier 1028 of FIG. 10B. In some examples, the identifier may be included in the list of requested SI messages. For example, the requested satellite information identifier 1026 and/or the requested beam information identifier 1028 may be included in the requested SI list 1024 of FIG. 10B. In some examples, the identifier may be included in the SI request message, but separate from the requested SI list. For example, the requested satellite information identifier 1026 and/or the requested beam information identifier 1028 may be included in the RRC SI request message 1020, but not as part of the requested SI list 1024 of FIG. 10B.

The identifier may include a satellite identifier (e.g., the requested satellite information identifier 1026 of FIG. 10B) and/or a beam identifier (e.g., the requested beam information identifier 1028 of FIG. 10B). For example, the SI request message may include an identifier of a communication satellite, may include an identifier of a grouping of satellites, may include a beam identifier, and/or may include a cell identifier. The grouping of satellites may be based on a satellite constellation. In some examples, the grouping of satellites may be based on a group of communication satellites. In some examples, the grouping of satellites may be based on a current serving communication satellite and/or a future communication satellite. In some examples, the grouping of satellites may be based on a tracking area identifier, a tracking zone identifier, a virtual cell identifier, and/or a UE location.

In some such examples in which the SI request message includes the identifier, the UE may receive the response message (e.g., at 1216) including the satellite information based on the identifier and/or the beam information associated with the identifier, as described in connection with the NTN response message 960, the satellite information 964 and/or the beam information 966 of FIG. 9.

In some examples, the SI request message may include an indicator indicating that the SI request message corresponds to an SI message or to an identifier associated with a group of satellites or beam information, as described in connection with the requested indexing flag 1030 of FIG. 10B. For example, the indicator (e.g., a flag) may be set to a first value to indicate that the SI request message indexes to SI messages or may be set to a second value to indicate that the SI request message indexes to an identifier (e.g., a satellite identifier and/or a beam identifier).

In some such examples in which the SI request message includes the indicator, the UE may receive an acknowledgement message to the SI request message (e.g., at 1214) based on the indicator, as described in connection with the request acknowledgement message 952 and/or the skipped information indicator 954 of FIG. 9. For example, the acknowledgement message may include at least one of a satellite information identifier and a beam information identifier, e.g., when the indicator is set to the second value.

In some examples, the SI request message may include a critical extension function indicating the requested information, as described in connection with the critical extension function 1022 of FIG. 10B. For example, the SI request message may be extended to carry at least one of a group of satellites identifier and a beam information identifier.

In some examples, the UE may transmit the request for the requested information while operating in a connected state (e.g., an RRC_CONNECTED state). For example, at 1212, the UE may transmit a dedicated SIB request message including an identifier indicating the request for the requested information, as described in connection with the NTN dedicated request message 944 of FIG. 9 and/or the NTN dedicated request message 1040 of FIG. 10C. The UE may transmit the dedicated SIB request while operating in the connected state. The transmitting of the dedicated SIB request message, at 1212, may be performed by a SIB request component 1354 of the apparatus 1302 of FIG. 13.

In some examples, the UE may include the identifier in a requested SIB list (e.g., which may be referred to as "requestedSIB-List" or by another name) of the dedicated SIB request message, as described in connection with the requested SIB list 1042 of FIG. 10C. For example, the requested SIB list 1042 may include the requested satellite information identifier 1044 and/or the requested beam information identifier 1046 of FIG. 10C. In some examples, the UE may include the identifier in the dedicated SIB request message, but separate from the requested SIB list.

In some examples, the UE may transmit the request for the requested information (e.g., at 1204) based on a determination that a validity associated with first satellite information is expiring, as described in connection with 940 of FIG. 9. In some such examples, the request for the requested information may include a satellite identifier corresponding to the first satellite information, such as the example requested satellite information identifier 1044 of FIG. 10C.

In some examples, the UE may transmit the request for the requested information (e.g., at 1204) based on an inability to perform measurements for the at least one requested communication satellite, the request including a satellite identifier corresponding to the at least one requested communication satellite, as described in connection with 942 of FIG. 9. In some such examples, the response message (e.g., at 1216) may include the satellite information associated with the at least one requested communication satellite, as described in connection with the satellite information 964 of FIG. 9.

Figure 13:
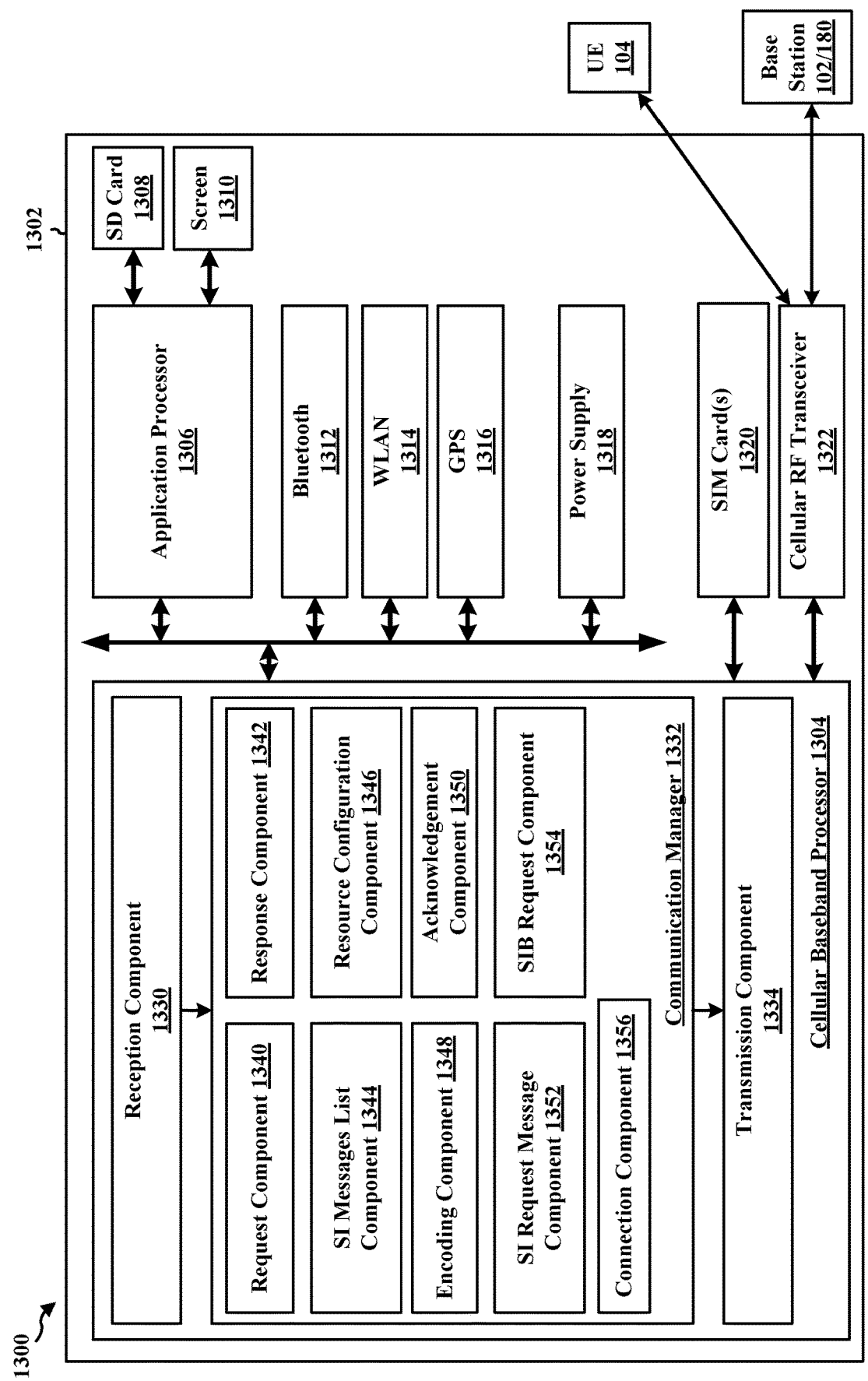
FIG. 13 is a diagram illustrating an example of a hardware implementation for an example apparatus, in accordance with the teachings disclosed herein.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or base station 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the cellular baseband processor 1304, and in another configuration, the apparatus 1302 may be the entire UE (e.g., see the UE 350 of FIG. 3) and include the additional modules of the apparatus 1302.

The communication manager 1332 includes a request component 1340 that is configured to transmit a request for requested information, for example, as described in connection with 1102 of FIGS. 11 and/or 1204 of FIG. 12.

The communication manager 1332 also includes a response component 1342 that is configured to receive a response message based on the request, the response message including one or more of: an NTN SIB, satellite information associated with at least one requested communication satellite, and beam information associated with the at least one requested communication satellite, for example, as described in connection with 1104 of FIGS. 11 and/or 1216 of FIG. 12.

The communication manager 1332 also includes an SI messages list component 1344 that is configured to receive a list of SI messages including one or more SI messages, each SI message of the list of SI messages associated with a broadcast status set to either broadcasting or not broadcast, for example, as described in connection with 1202 of FIG. 12.

The communication manager 1332 also includes a resource configuration component 1346 that is configured to receive a resource configuration including a mapping of SI messages of the list of SI messages to respective PRACH resources, for example, as described in connection with 1206 of FIG. 12.

The communication manager 1332 also includes an encoding component 1348 that is configured to encode the request for the requested information using at least one of a first PRACH resource of the resource configuration that maps to the first SI message, or a second PRACH resource of the resource configuration that maps to a group of satellites including the at least one requested communication satellite, for example, as described in connection with 1208 of FIG. 12.

The communication manager 1332 also includes an acknowledgement component 1350 that is configured to receive a request acknowledgement after transmitting the request, the request acknowledgement indicating one or more broadcasting SI messages scheduled for broadcasting, for example, as described in connection with 1214 of FIG. 12.

The communication manager 1332 also includes an SI request message component 1352 that is configured to transmit an SI request message including the request for the requested information, the SI request message including a list of requested SI messages including at least the first SI message, for example, as described in connection with 1210 of FIG. 12.

The communication manager 1332 also includes a SIB request component 1354 that is configured to transmit a dedicated SIB request message including an identifier indicating the request for the requested information, for example, as described in connection with 1212 of FIG. 12.

The communication manager 1332 also includes a connection component 1356 that is configured to establish a connection with a communication satellite to facilitate communication via an NTN based in part on the response message, for example, as described in connection with 1218 of FIG. 12.

The apparatus may include additional components that perform each of the blocks of the algorithm in the flowcharts of FIGS. 11 and/or 12. As such, each block in the flowcharts of FIGS. 11 and/or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for transmitting a request for requested information, the requested information including one or more of SI and satellite information. The example apparatus 1302 also includes means for receiving a response message based on the request, the response message including one or more of: an NTN SIB, satellite information associated with at least one requested communication satellite, and beam information associated with the at least one requested communication satellite.

In another configuration, the example apparatus 1302 also includes means for receiving a list of SI messages including one or more SI messages, each SI message of the list of SI messages associated with a broadcast status set to either broadcasting or not broadcasting, where the request for the SI indicates a first SI message, the first SI message included in the list of SI messages, the first SI message having the broadcast status set to not broadcasting, and the first SI message carrying at least one of the satellite information and the beam information.

In another configuration, the example apparatus 1302 also includes means for receiving a resource configuration including a mapping of SI messages of the list of SI messages to respective PRACH resources. The example apparatus 1302 also includes means for encoding the request for the requested information using at least one of: a first PRACH resource of the resource configuration that maps to the first SI message, or a second PRACH resource of the resource configuration that maps to a group of satellites including the at least one requested communication satellite, where the UE transmits the request while performing a random access procedure.

In another configuration, the example apparatus 1302 also includes means for receiving a request acknowledgement after transmitting the request, the request acknowledgement indicating one or more broadcasting SI messages scheduled for broadcasting. The example apparatus 1302 also includes means for changing to an idle state after receiving the request acknowledgement, where the UE receives the response message while in the idle state, the response message including an SI message identifier, a group of satellites identifier, or a beam identifier of the at least one requested communication satellite.

In another configuration, the example apparatus 1302 also includes means for transmitting an SI request message including the request for the requested information, the SI request message including a list of requested SI messages including at least the first SI message.

In another configuration, the example apparatus 1302 also includes means for receiving an acknowledgement message to the SI request message based on the indicator, the acknowledgement message including at least one of a satellite information identifier and a beam information identifier.

In another configuration, the example apparatus 1302 also includes means for transmitting a dedicated SIB request message including an identifier indicating the request for the requested information, where the UE transmits the request for the requested information while operating in a connected state.

In another configuration, the example apparatus 1302 also includes means for transmitting the request for the requested information based on a determination that a validity associated with first satellite information is expiring, and the request includes a satellite identifier corresponding to the first satellite information.

In another configuration, the example apparatus 1302 also includes means for transmitting the request for the requested information based on an inability to perform measurements for the at least one requested communication satellite, the request including a satellite identifier corresponding to the at least one requested communication satellite, and the response message includes the satellite information associated with the at least one requested communication satellite.

In another configuration, the example apparatus 1302 also includes means for establishing a connection with the communication satellite to facilitate communication via an NTN based in part on the response message.

The means may be one or more of the components of the apparatus 1302 configured to perform the functions recited by the means. As described supra, the apparatus 1302 may include the TX processor 368, the RX processor 356, and the controller/processor 359. As such, in one configuration, the means may be the TX processor 368, the RX processor 356, and the controller/processor 359 configured to perform the functions recited by the means.

Figure 14:
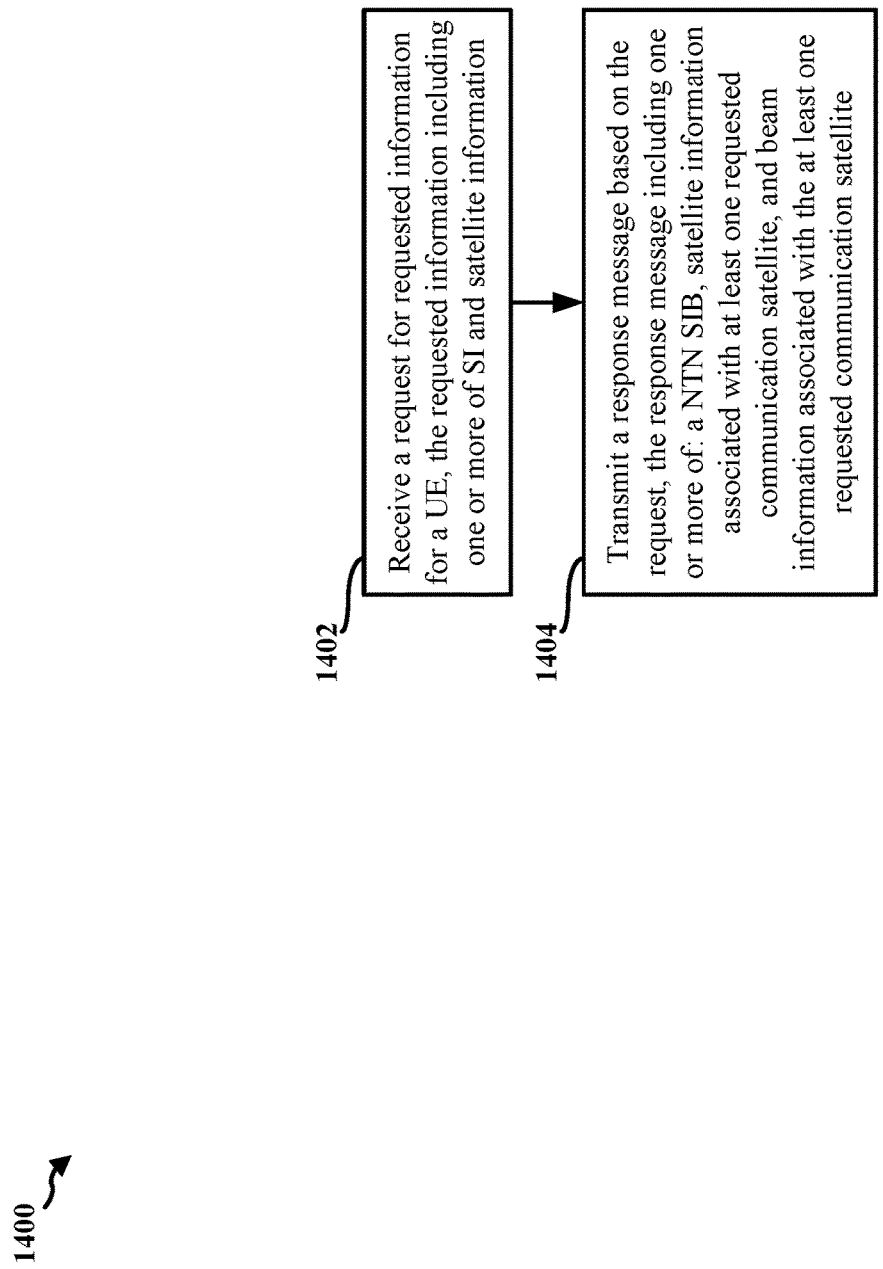
FIG. 14 is a flowchart of a method of wireless communication at a base station, in accordance with the teachings disclosed herein.

FIG. 14 is a flowchart 1400 of a method of wireless communication. The method may be performed by a base station (e.g., the base station 102/180, the base station 310, the base station 902, and/or an apparatus 1602 of FIG. 16). The method may facilitate improving cell coverage and/or increased throughput by enabling a UE to request NTN-specific system information (e.g., an NTN SIB, satellite-specific information, and/or beam-specific information).

At 1402, the base station receives a request for requested information for a UE, the requested information including one or more of SI and satellite information, as described in connection with the PRACH encoded request 922, the RRC SI request message 930, and/or the NTN dedicated request message 944 of FIG. 9. The request for the requested information may include a request for NTN-specific information, for satellite information associated with at least one NTN device, and/or for beam information associated with at least one NTN device. The receiving of the request, at 1402, may be performed by a request component 1640 of the apparatus 1602 of FIG. 16.

At 1404, the base station transmits a response message based on the request, as described in connection with the NTN response message 960 of FIG. 9. The response message may include one or more of an NTN SIB (e.g., which may be referred to as "SIBNTN" or by another name), satellite information associated with at least one requested communication satellite, and beam information associated with the at least one requested communication satellite. In some examples, the satellite information may include one or more of position information associated with the at least one requested communication satellite, velocity information associated with the at least one requested communication satellite, location information of the at least one requested communication satellite, the location information including Earth-centered, Earth-fixed coordinates, orbital parameters associated with the at least one requested communication satellite, the orbital parameters including on or more of: a semi-major axis, eccentricity, inclination, right ascension of an ascending node, argument of periapsis, mean anomaly at a reference point in time, and an epoch, a quantity of beams supported by the at least one requested communication satellite, and an indicator indicating shared beam properties associated with the beams supported by the at least one requested communication satellite. In some examples, the beam information may include one or more of a center of at least one beam associated with the at least one requested communication satellite, a size of the at least one beam (e.g., a beam footprint size), an indicator indicating that a cell supported by the at least one beam is fixed, and an elevation associated with the at least one beam. In some examples, the UE may receive the response message via a broadcast channel (BCH). In some examples, the UE may receive the response message via a downlink channel (e.g., a PDCCH or a PDSCH). In some examples, the response message may include an acknowledgement that the requested information is available for acquiring via one or more broadcast system information messages. In some examples, the response message may include a downlink message including the requested information. The transmitting of the response message, at 1404, may be performed by a response component 1642 of the apparatus 1602 of FIG. 16.

In some examples, the base station and the UE may be communicating via an NTN. For example, the base station may receive the request for the requested information (e.g., at 1402) from the UE via a communication satellite. The base station may receive the request for the requested information to enable the UE to acquire updated NTN-specific system information, to enable the UE to acquire NTN-SI associated with neighboring satellites, and/or to enable the UE to acquire NTN-SI associated with future satellites. The base station may be a terrestrial-based base station, as described in connection with the base station 506 of FIG. 5, may be an NTN device/base station, as described in connection with the NTN device/base station 602 of FIG. 6, or may be a disaggregated base station, as described in connection with the NTN device-DU 702 and the base station-CU 707 of FIG. 7.

In some examples, the base station and the UE may be communicating via a terrestrial network. In some such examples, the base station may receive the request for the requested information (e.g., at 1402) to enable the UE to use the response message (e.g., at 1404) to establish a connection with a communication satellite to facilitate communication with the NTN.

Figure 15:
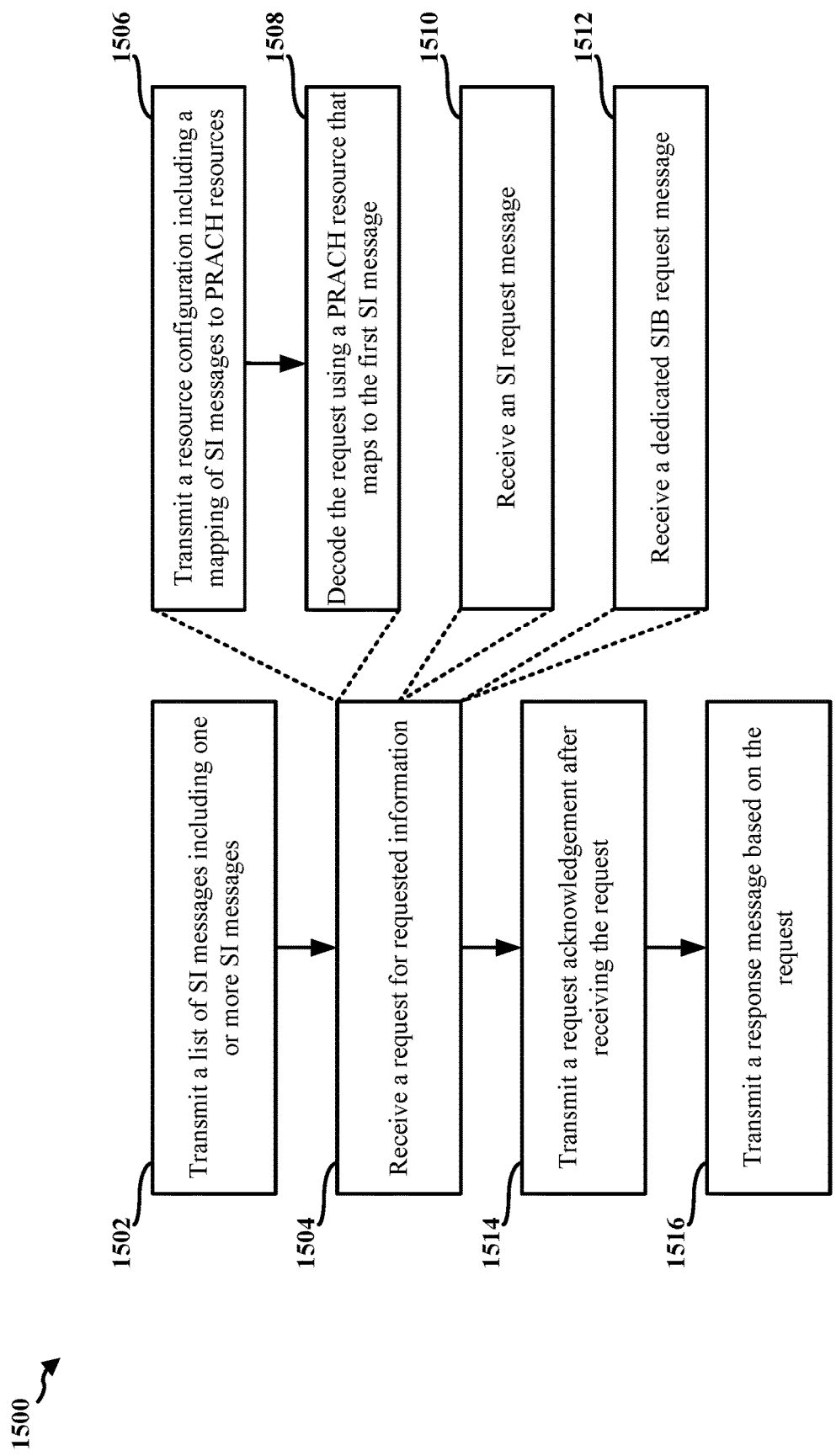
FIG. 15 is a flowchart of a method of wireless communication at a base station, in accordance with the teachings disclosed herein.

FIG. 15 is a flowchart 1500 of a method of wireless communication. The method may be performed by a base station (e.g., the base station 102/180, the base station 310, the base station 902, and/or an apparatus 1602 of FIG. 16). The method may facilitate improving cell coverage and/or increased throughput by enabling a UE to request NTN-specific system information (e.g., an NTN SIB, satellite-specific information, and/or beam-specific information).

At 1504, the base station receives a request for requested information for a UE, the requested information including one or more of SI and satellite information, as described in connection with the PRACH encoded request 922, the RRC SI request message 930, and/or the NTN dedicated request message 944 of FIG. 9. The request for the requested information may include a request for NTN-specific information, for satellite information associated with at least one NTN device, and/or for beam information associated with at least one NTN device. The receiving of the request, at 1504, may be performed by a request component 1640 of the apparatus 1602 of FIG. 16.

At 1516, the base station transmits a response message based on the request, as described in connection with the NTN response message 960 of FIG. 9. The response message may include one or more of an NTN SIB (e.g., which may be referred to as "SIBNTN" or by another name), satellite information associated with at least one requested communication satellite, and beam information associated with the at least one requested communication satellite. In some examples, the satellite information may include one or more of position information associated with the at least one requested communication satellite, velocity information associated with the at least one requested communication satellite, location information of the at least one requested communication satellite, the location information including Earth-centered, Earth-fixed coordinates, orbital parameters associated with the at least one requested communication satellite, the orbital parameters including on or more of: a semi-major axis, eccentricity, inclination, right ascension of an ascending node, argument of periapsis, mean anomaly at a reference point in time, and an epoch, a quantity of beams supported by the at least one requested communication satellite, and an indicator indicating shared beam properties associated with the beams supported by the at least one requested communication satellite. In some examples, the beam information may include one or more of a center of at least one beam associated with the at least one requested communication satellite, a size of the at least one beam (e.g., a beam footprint size), an indicator indicating that a cell supported by the at least one beam is fixed, and an elevation associated with the at least one beam. In some examples, the UE may receive the response message via a broadcast channel (BCH). In some examples, the UE may receive the response message via a downlink channel (e.g., a PDCCH or a PDSCH). In some examples, the response message may include an acknowledgement that the requested information is available for acquiring via one or more broadcast system information messages. In some examples, the response message may include a downlink message including the requested information. The transmitting of the response message, at 1516, may be performed by a response component 1642 of the apparatus 1602 of FIG. 16.

In some examples, the base station and the UE may be communicating via an NTN. For example, the base station may receive the request for the requested information (e.g., at 1504) from the UE via a communication satellite. The base station may receive the request for the requested information to enable the UE to acquire updated NTN-specific system information, to enable the UE to acquire NTN-SI associated with neighboring satellites, and/or to enable the UE to acquire NTN-SI associated with future satellites. The base station may be a terrestrial-based base station, as described in connection with the base station 506 of FIG. 5, may be an NTN device/base station, as described in connection with the NTN device/base station 602 of FIG. 6, or may be a disaggregated base station, as described in connection with the NTN device-DU 702 and the base station-CU 707 of FIG. 7.

In some examples, the base station and the UE may be communicating via a terrestrial network. In some such examples, the base station may receive the request for the requested information (e.g., at 1504) to enable the UE to use the response message (e.g., at 1516) to establish a connection with a communication satellite to facilitate communication with the NTN.

In some examples, the base station may configure the UE to request system information for SI messages that are not being broadcast. For example, at 1502, the base station may transmit a list of SI messages (e.g., which may be referred to as "schedulingInfoList" or by another name) including one or more SI messages, each SI message of the list of SI messages associated with a broadcast status set to either broadcasting or not broadcast, as described in connection with the SI scheduling information 910 of FIG. 9 and/or the scheduling information list 1002 of FIG. 10A. In some examples, the base station may transmit the list of SI messages via a SIB1 message. The transmitting of the list of SI messages, at 1502, may be performed by an SI messages list component 1644 of the apparatus 1602 of FIG. 16.

In some examples, the request for the requested information (e.g., at 1504) may indicate a first SI message, the first SI message included in the list of SI messages, the first SI message having the broadcast status set to not broadcasting, and the first SI message carrying at least one of the satellite information and the beam information, as described in connection with the example NTN-SI message 1006 and the broadcast status 1008 of FIG. 10A.

In some examples, the base station may receive the request for the requested information as part of a random access procedure. For example, the UE may transmit the request for the requested information while operating in an idle state. In the illustrated example of FIG. 15, at 1506, the base station may transmit a resource configuration (e.g., which may be referred to as "si-RequestConfig" or by another name) including a mapping of SI messages of the list of SI messages to respective PRACH resources, as described in connection with the example SI scheduling information 910 of FIG. 9 and/or the example SI scheduling information 1000 of FIG. 10A. In some examples, the base station may transmit the resource configuration via a SIB1 message. The transmitting of the resource configuration, at 1506, may be performed by a resource configuration component 1646 of the apparatus 1602 of FIG. 16.

In some examples, the base station may receive the request for the requested information encoded using the PRACH resource while performing the random access procedure.

At 1508, the base station may decode the request for the requested information using at least one of a first PRACH resource of the resource configuration that maps to the first SI message, or a second PRACH resource of the resource configuration that maps to a group of satellites including the at least one requested communication satellite, as described in connection with 950 of FIG. 9. For example, the base station may receive the PRACH encoded request 922 of FIG. 9. In some examples, the PRACH resource may include a PRACH preamble. In some examples, a group identity of the group of satellites may be based at least in part on a satellite constellation, a PLMN identity, a frequency, a neighbor satellite list, a tracking area, or a geographical location. The decoding of the request using the PRACH resource, at 1508, may be performed by a decoding component 1648 of the apparatus 1602 of FIG. 16.

At 1514, the base station may transmit a request acknowledgement after receiving the request, the request acknowledgement indicating one or more broadcasting SI messages scheduled for broadcasting, as described in connection with the request acknowledgement message 952 of FIG. 9. In some examples, the request acknowledgement may further indicate secondary information being skipped, the secondary information being based on the request for the requested information and including information associated with at least one or more groups of satellites, as described in connection with the skipped information indicator 954 of FIG. 9. The transmitting of the request acknowledgement, at 1514, may be performed by an acknowledgement component 1650 of the apparatus 1602 of FIG. 16.

In some examples, the base station may transmit the response message (e.g., at 1516) while the UE is in an idle state, the response message including an SI message identifier, a group of satellites identifier, or a beam identifier of the at least one requested communication satellite. For example, the UE may change to the idle state after receiving the request acknowledgement and monitor for the requested SI.

In some examples, the base station may receive the request for the requested information via a control channel SI request. For example, at 1510, the base station may receive an SI request message (e.g., which may be referred to as "RRCSystemInfoRequest" or by another name) including the request for the SI, the SI request message including a list of requested SI messages (e.g., which may be referred to as "requested-SI-List" or by another name) including at least the first SI message, as described in connection with the RRC SI request message 930 of FIG. 9, the RRC SI request message 1020 of FIG. 10A, and/or the requested SI list 1024 of FIG. 10B. The base station may receive the SI request message via an uplink common control channel (UL CCCH). The receiving of the SI request message, at 1510, may be performed by an SI request message component 1652 of the apparatus 1602 of FIG. 16.

In some examples, the SI request message may include an identifier, as described in connection with the requested satellite information identifier 1026 and/or the requested beam information identifier 1028 of FIG. 10B. In some examples, the identifier may be included in the list of requested SI messages. For example, the requested satellite information identifier 1026 and/or the requested beam information identifier 1028 may be included in the requested SI list 1024 of FIG. 10B. In some examples, the identifier may be included in the SI request message, but separate from the requested SI list. For example, the requested satellite information identifier 1026 and/or the requested beam information identifier 1028 may be included in the RRC SI request message 1020, but not as part of the requested SI list 1024 of FIG. 10B.

The identifier may include a satellite identifier (e.g., the requested satellite information identifier 1026 of FIG. 10B) and/or a beam identifier (e.g., the requested beam information identifier 1028 of FIG. 10B). For example, the SI request message may include an identifier of a communication satellite, may include an identifier of a grouping of satellites, may include a beam identifier, and/or may include a cell identifier. The grouping of satellites may be based on a satellite constellation. In some examples, the grouping of satellites may be based on a group of communication satellites. In some examples, the grouping of satellites may be based on a current serving communication satellite and/or a future communication satellite. In some examples, the grouping of satellites may be based on a tracking area identifier, a tracking zone identifier, a virtual cell identifier, and/or a UE location.

In some such examples in which the SI request message includes the identifier, the base station may transmit the response message (e.g., at 1516) including the satellite information based on the identifier and/or the beam information associated with the identifier, as described in connection with the NTN response message 960, the satellite information 964 and/or the beam information 966 of FIG. 9.

In some examples, the SI request message may include an indicator indicating that the SI request message corresponds to an SI message or to an identifier associated with a group of satellites or beam information, as described in connection with the requested indexing flag 1030 of FIG. 10B. For example, the indicator (e.g., a flag) may be set to a first value to indicate that the SI request message indexes to SI messages or may be set to a second value to indicate that the SI request message indexes to an identifier (e.g., a satellite identifier and/or a beam identifier).

In some such examples in which the SI request message includes the indicator, the base station may transmit an acknowledgement message (e.g., at 1514) based on the indicator, as described in connection with the request acknowledgement message 952 and/or the skipped information indicator 954 of FIG. 9. For example, the acknowledgement message may include at least one of a satellite information identifier and a beam information identifier, e.g., when the indicator is set to the second value.

In some examples, the SI request message may include a critical extension function indicating the requested information, as described in connection with the critical extension function 1022 of FIG. 10B. For example, the SI request may be extended to carry at least one of a group of satellites identifier and a beam information identifier.

In some examples, the base station may receive the request for the requested information while the UE is operating in a connected state (e.g., an RRC_CONNECTED state). For example, at 1512, the base station may receive a dedicated SIB request message including an identifier indicating the request for the SI, as described in connection with the NTN dedicated request message 944 of FIG. 9 and/or the NTN dedicated request message 1040 of FIG. 10C. The base station may receive the dedicated SIB request while the UE is operating in the connected state with the base station. The receiving of the dedicated SIB request message, at 1512, may be performed by a SIB request component 1654 of the apparatus 1602 of FIG. 16.

In some examples, the dedicated SIB request message may include a requested SIB list (e.g., which may be referred to as "requestedSIB-List" or by another name) including the identifier, as described in connection with the requested SIB list 1042 of FIG. 10C. For example, the requested SIB list 1042 may include the requested satellite information identifier 1044 and/or the requested beam information identifier 1046 of FIG. 10C. In some examples, the UE may include the identifier in the dedicated SIB request message, but separate from the requested SIB list.

In some examples, the request for the requested information (e.g., at 1504) may include a satellite identifier corresponding to the at least one requested communication satellite, such as the example requested satellite information identifier 1044 of FIG. 10C. In some such examples, the base station may transmit the response message (e.g., at 1516) including the satellite information based on the satellite identifier, as described in connection with the satellite information 964 of FIG. 9.

Figure 16:
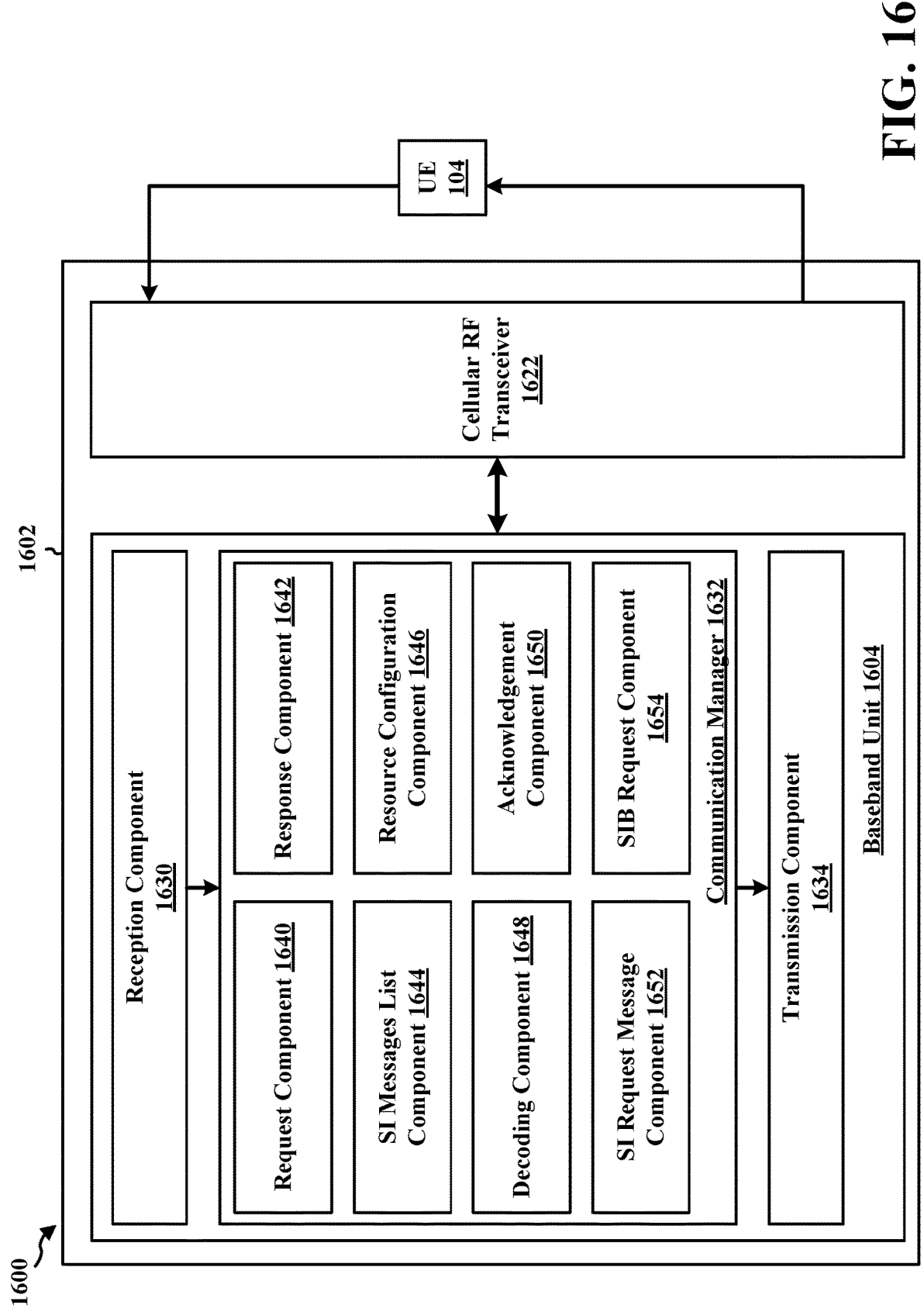
FIG. 16 is a diagram illustrating an example of a hardware implementation for an example apparatus, in accordance with the teachings disclosed herein.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a request component 1640 that is configured to receive a request for requested information for a UE, for example, as described in connection with 1402 of FIGS. 14 and/or 1504 of FIG. 15.

The communication manager 1632 also includes a response component 1642 that is configured to transmit a response message based on the request, the response message including one or more of: an NTN SIB, satellite information associated with at least one requested communication satellite, and beam information associated with the at least one requested communication satellite, for example, as described in connection with 1404 of FIGS. 14 and/or 1516 of FIG. 15.

The communication manager 1632 also includes an SI messages list component 1644 that is configured to transmit a list of SI messages including one or more SI messages, each SI message of the list of SI messages associated with a broadcast status set to either broadcasting or not broadcast, for example, as described in connection with 1502 of FIG. 15.

The communication manager 1632 also includes a resource configuration component 1646 that is configured to transmit a resource configuration including a mapping of SI messages of the list of SI messages to respective PRACH resources, for example, as described in connection with 1506 of FIG. 15.

The communication manager 1632 also includes a decoding component 1648 that is configured to decode the request for the requested information using at least one of a first PRACH resource of the resource configuration that maps to the first SI message, or a second PRACH resource of the resource configuration that maps to a group of satellites including the at least one requested communication satellite, for example, as described in connection with 1508 of FIG. 15.

The communication manager 1632 also includes an acknowledgement component 1650 that is configured to transmit a request acknowledgement after receiving the request, the request acknowledgement indicating one or more broadcasting SI messages scheduled for broadcasting, for example, as described in connection with 1514 of FIG. 15.

The communication manager 1632 also includes a SI request message component 1652 that is configured to receive an SI request message including the request for the requested information, the SI request message including a list of requested SI messages including at least the first SI message, for example, as described in connection with 1510 of FIG. 15.

The communication manager 1632 also includes a SIB request component 1654 that is configured to receive a dedicated SIB request message including an identifier indicating the request for the requested information, for example, as described in connection with 1512 of FIG. 15.

The apparatus may include additional components that perform each of the blocks of the algorithm in the flowcharts of FIGS. 14 and/or 15. As such, each block in the flowcharts of FIGS. 14 and/or 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for receiving a request for requested information for a UE, the requested information including one or more of SI and satellite information. The example apparatus 1602 also includes means for transmitting a response message based on the request, the response message including one or more of: an NTN SIB, satellite information associated with at least one requested communication satellite, and beam information associated with the at least one requested communication satellite.

In another configuration, the example apparatus 1602 also includes means for transmitting a list of SI messages including one or more SI messages, each SI message of the list of SI messages associated with a broadcast status set to either broadcasting or not broadcasting, where the request for the SI indicates a first SI message, the first SI message included in the list of SI messages, the first SI message having the broadcast status set to not broadcasting, and the first SI message carrying at least one of the satellite information and the beam information.

In another configuration, the example apparatus 1602 also includes means for transmitting a resource configuration including a mapping of SI messages of the list of SI messages to respective PRACH resources. The example apparatus 1602 also includes means for decoding the request for the requested information using at least one of: a first PRACH resource of the resource configuration that maps to the first SI message, or a second PRACH resource of the resource configuration that maps to a group of satellites including the at least one requested communication satellite, where the base station receives the request while performing a random access procedure with the UE.

In another configuration, the example apparatus 1602 also includes means for transmitting a request acknowledgement after receiving the request, the request acknowledgement indicating one or more broadcasting SI messages scheduled for broadcasting, where the response message includes an SI message identifier, a group of satellites identifier, or a beam identifier of the at least one requested communication satellite.

In another configuration, the example apparatus 1602 also includes means for receiving an SI request message including the request for the requested information, the SI request message including a list of requested SI messages including at least the first SI message.

In another configuration, the example apparatus 1602 also includes means for transmitting an acknowledgement message to the SI request message based on the indicator, the acknowledgement message including at least one of a satellite information identifier and a beam information identifier.

In another configuration, the example apparatus 1602 also includes means for receiving a dedicated SIB request message including an identifier indicating the request for the requested information, where the base station receives the request for the requested information while operating in a connected state with the UE.

In another configuration, the example apparatus 1602 also includes means for transmitting the response message including the satellite information based on the satellite identifier.

In another configuration, the example apparatus 1602 also includes means for receiving the request for the requested information from the UE via a communication satellite. The example apparatus 1602 also includes means for receiving the request for the SI while communicating with the UE via a terrestrial network.

The means may be one or more of the components of the apparatus 1602 configured to perform the functions recited by the means. As described supra, the apparatus 1602 may include the TX processor 316, the RX processor 370, and the controller/processor 375. As such, in one configuration, the means may be the TX processor 316, the RX processor 370, and the controller/processor 375 configured to perform the functions recited by the means.

Aspects presented herein enable on-demand ephemeris and beam information requests. For example, aspects disclosed herein enable a UE to transmit an on-demand request for NTN-specific system information (e.g., an NTN SIB, satellite information associated with at least one requested communication satellite, and/or beam information associated with the at least one requested communication satellite), which may facilitate improving communication performance, for example, by reducing overhead and improving cell coverage.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an method for wireless communication at a UE including: transmitting a request for requested information, the requested information including one or more of SI and satellite information; and receiving a response message based on the request, the response message including one or more of: an NTN SIB, satellite information associated with at least one requested communication satellite, and beam information associated with the at least one requested communication satellite.

Aspect 2 is the method of aspect 1, further including that the satellite information associated with the at least one requested communication satellite includes one or more of: position information associated with the at least one requested communication satellite, velocity information associated with the at least one requested communication satellite, location information of the at least one requested communication satellite, the location information including Earth-centered, Earth-fixed coordinates, orbital parameters associated with the at least one requested communication satellite, the orbital parameters including on or more of: a semi-major axis, eccentricity, inclination, right ascension of an ascending node, argument of periapsis, mean anomaly at a reference point in time, and an epoch, a quantity of beams supported by the at least one requested communication satellite, and an indicator indicating shared beam properties associated with the beams supported by the at least one requested communication satellite.

Aspect 3 is the method of any of aspects 1 and 2, further including that the beam information includes one or more of: a center of at least one beam associated with the at least one requested communication satellite, a size of the at least one beam, an indicator indicating that a cell supported by the at least one beam is fixed, and an elevation associated with the at least one beam.

Aspect 4 is the method of any of aspects 1 to 3, further including that the response message is one or more of: an acknowledgement that the requested information is available for acquiring via one or more broadcast system information messages, and a downlink message including the requested information.

Aspect 5 is the method of any of aspects 1 to 4, further including: receiving a list of SI messages including one or more SI messages, each SI message of the list of SI messages associated with a broadcast status set to either broadcasting or not broadcasting, where the request for the requested information indicates a first SI message, the first SI message included in the list of SI messages, the first SI message having the broadcast status set to not broadcasting, and the first SI message carrying at least one of the satellite information and the beam information.

Aspect 6 is the method of any of aspects 1 to 5, further including: receiving a resource configuration including a mapping of SI messages of the list of SI messages to respective PRACH resources; and encoding the request for the requested information using at least one of: a first PRACH resource of the resource configuration that maps to the first SI message, or a second PRACH resource of the resource configuration that maps to a group of satellites including the at least one requested communication satellite, where the UE transmits the request while performing a random access procedure.

Aspect 7 is the method of any of aspects 1 to 6, further including that a group identity of the group of satellites may be based at least in part on a satellite constellation, a PLMN identity, a frequency, a neighbor satellite list, a tracking area, or a geographical location.

Aspect 8 is the method of any of aspects 1 to 7, further including: receiving a request acknowledgement after transmitting the request, the request acknowledgement indicating one or more broadcasting SI messages scheduled for broadcasting; and changing to an idle state after receiving the request acknowledgement, where the UE receives the response message while in the idle state, the response message including an SI message identifier, a group of satellites identifier, or a beam identifier of the at least one requested communication satellite.

Aspect 9 is the method of any of aspects 1 to 8, further including that the request acknowledgement further indicates secondary information being skipped, the secondary information being based on the request and including information associated with at least one or more groups of satellites.

Aspect 10 is the method of any of aspects 1 to 5, further including: transmitting an SI request message including the request for the requested information, the SI request message including a list of requested SI messages including at least the first SI message.

Aspect 11 is the method of any of aspects 1 to 10, further including that the SI request message includes an identifier, and the response message includes at least one of the satellite information and the beam information associated with the identifier.

Aspect 12 is the method of any of aspects 1 to 11, further including that the SI request message includes an indicator indicating that the SI request message corresponds to an SI message or to an identifier associated with a group of satellites or beam information, the method further comprising: receiving an acknowledgement message to the SI request message based on the indicator, the acknowledgement message including at least one of a satellite information identifier and a beam information identifier.

Aspect 13 is the method of any of aspects 1 to 12, further including that the SI request message is extended to carry at least one of a group of satellites identifier and a beam information identifier.

Aspect 14 is the method of any of aspects 1 to 5, further including: transmitting a dedicated SIB request message including an identifier indicating the request for the requested information, where the UE transmits the request for the requested information while operating in a connected state.

Aspect 15 is the method of any of aspects 1 to 14, further including that the UE includes the identifier in a requested SIB list of the dedicated SIB request message.

Aspect 16 is the method of any of aspects 1 to 15, further including that the UE transmits the request for the requested information based on a determination that a validity associated with first satellite information is expiring, and the request includes a satellite identifier corresponding to the first satellite information.

Aspect 17 is the method of any of aspects 1 to 16, further including that the UE transmits the request for the requested information based on an inability to perform measurements for the at least one requested communication satellite, the request including a satellite identifier corresponding to the at least one requested communication satellite, and the response message includes the satellite information associated with the at least one requested communication satellite.

Aspect 18 is the method of any of aspects 1 to 17, further including that the UE transmits the request for the requested information to a base station via a communication satellite or to a terrestrial-based base station, the method further comprising: establishing a connection with the communication satellite to facilitate communication via an NTN based in part on the response message.

Aspect 19 is an apparatus for wireless communication including at least one processor coupled to a memory and configured to implement any of aspects 1 to 18.

Aspect 20 is an apparatus for wireless communication including means for implementing any of aspects 1 to 18.

Aspect 21 is a non-transitory computer-readable storage medium storing computer executable code, where the code, when executed, causes a processor to implement any of aspects 1 to 18.

Aspect 22 is an method for wireless communication at a base station, including: receiving a request for requested information for a UE, the requested information including one or more SI and satellite information; and transmitting a response message based on the request, the response message including one or more of: an NTN SIB, satellite information associated with at least one requested communication satellite, and beam information associated with the at least one requested communication satellite.

Aspect 23 is the method of aspect 22, further including that the satellite information associated with the at least one requested communication satellite includes one or more of: position information associated with the at least one requested communication satellite, velocity information associated with the at least one requested communication satellite, location information of the at least one requested communication satellite, the location information including Earth-centered, Earth-fixed coordinates, orbital parameters associated with the at least one requested communication satellite, the orbital parameters including on or more of: a semi-major axis, eccentricity, inclination, right ascension of an ascending node, argument of periapsis, mean anomaly at a reference point in time, and an epoch, a quantity of beams supported by the at least one requested communication satellite, and an indicator indicating shared beam properties associated with the beams supported by the at least one requested communication satellite.

Aspect 24 is the method of any of aspects 22 and 23, further including that the beam information includes one or more of: a center of at least one beam associated with the at least one requested communication satellite, a size of the at least one beam, an indicator indicating that a cell supported by the at least one beam is fixed, and an elevation associated with the at least one beam.

Aspect 25 is the method of any of aspects 22 to 24, further including that the response message is one or more of: an acknowledgement that the requested information is available for acquiring via one or more broadcast system information messages, and a downlink message including the requested information.

Aspect 26 is the method of any of aspects 22 to 25, further including: transmitting a list of SI messages including one or more SI messages, each SI message of the list of SI messages associated with a broadcast status set to either broadcasting or not broadcasting, where the request for the requested information indicates a first SI message, the first SI message included in the list of SI messages, the first SI message having the broadcast status set to not broadcasting, and the first SI message carrying at least one of the satellite information and the beam information.

Aspect 27 is the method of any of aspects 22 to 26, further including: transmitting a resource configuration including a mapping of SI messages of the list of SI messages to respective PRACH resources; and decoding the request for the requested information using at least one of: a first PRACH resource of the resource configuration that maps to the first SI message, or a second PRACH resource of the resource configuration that maps to a group of satellites including the at least one requested communication satellite, where the base station receives the request while performing a random access procedure with the UE.

Aspect 28 is the method of any of aspects 22 to 27, further including: transmitting a request acknowledgement after receiving the request, the request acknowledgement indicating one or more broadcasting SI messages scheduled for broadcasting, where the response message includes an SI message identifier, a group of satellites identifier, or a beam identifier of the at least one requested communication satellite.

Aspect 29 is the method of any of aspects 22 to 28, further including that the request acknowledgement further indicates secondary information being skipped, the secondary information being based on the request and including information associated with at least one or more groups of satellites.

Aspect 30 is the method of any of aspects 22 to 26, further including: receiving an SI request message including the request for the requested information, the SI request message including a list of requested SI messages including at least the first SI message.

Aspect 31 is the method of any of aspects 22 to 30, further including that the SI request message includes an identifier, and the response message includes at least one of the satellite information and the beam information associated with the identifier.

Aspect 32 is the method of any of aspects 22 to 31, further including that the SI request message includes an indicator indicating that the SI request message corresponds to an SI message or to an identifier associated with a group of satellites or beam information, the method further comprising: transmitting an acknowledgement message to the SI request message based on the indicator, the acknowledgement message including at least one of a satellite information identifier and a beam information identifier.

Aspect 33 is the method of any of aspects 22 to 32, further including that the SI request message is extended to carry at least one of a group of satellites identifier and a beam information identifier.

Aspect 34 is the method of any of aspects 22 to 26, further including: receiving a dedicated SIB request message including an identifier indicating the request for the requested information, where the base station receives the request for the SI while operating in a connected state with the UE.

Aspect 35 is the method of any of aspects 22 to 34, further including that the dedicated SIB request message includes a requested SIB list including the identifier.

Aspect 36 is the method of any of aspects 22 to 35, further including that the request for the requested information includes a satellite identifier corresponding to the at least one requested communication satellite, and the base station transmits the response message including the satellite information based on the satellite identifier.

Aspect 37 is the method of any of aspects 22 to 36, further including that the base station receives the request for the requested information from the UE via a communication satellite, or receives the request for the requested information while communicating with the UE via a terrestrial network.

Aspect 38 is an apparatus for wireless communication including at least one processor coupled to a memory and configured to implement any of aspects 22 to 37.

Aspect 39 is an apparatus for wireless communication including means for implementing any of aspects 22 to 37.

Aspect 40 is a non-transitory computer-readable storage medium storing computer executable code, where the code, when executed, causes a processor to implement any of aspects 22 to 37.

What is claimed is:
1. A user equipment (UE), comprising:
at least one memory comprising instructions;
at least one transceiver; and
at least one processor configured to execute the instructions to cause the UE to:
transmit, via the at least one transceiver, a request for beam information associated with at least one communication satellite; and
receive, via the at least one transceiver and after transmission of the request, a response message including the beam information that includes a beam property of one or more beams supported by the at least one communication satellite.
2. The UE of claim 1, wherein the beam information associated with the at least one communication satellite further includes one or more of:
a quantity of beams supported by the at least one communication satellite, and
an indicator indicating shared beam properties associated with the beams supported by the at least one communication satellite.
3. The UE of claim 1, wherein the response message comprises one or more of:
an acknowledgement that requested information is available for acquiring via one or more broadcast system information messages, or
a downlink message including the requested information.

4. The UE of claim 1, wherein the at least one processor is further configured to execute the instructions to cause the UE to:
receive, via the at least one transceiver, a list of SI messages including one or more SI messages, each SI message of the list of SI messages associated with a broadcast status set to either broadcasting or not broadcasting,
wherein the request indicates a first SI message, wherein the first SI message is included in the list of SI messages, wherein the first SI message has the broadcast status set to not broadcasting, and wherein the first SI message carries at least one of satellite information or the beam information.

5. The UE of claim 4, wherein the at least one processor is further configured to execute the instructions to cause the UE to:
receive, via the at least one transceiver, a resource configuration including a mapping of the one or more SI messages of the list of SI messages to respective physical random access channel (PRACH) resources; and
encode the request for the beam information using at least one of:
a first PRACH resource of the resource configuration that maps to the first SI message, or
a second PRACH resource of the resource configuration that maps to a group of satellites including the at least one communication satellite,
wherein the at least one processor is further configured to execute the instructions to cause the UE to perform a random access procedure while transmitting the request.

6. The UE of claim 5, wherein a group identity of the group of satellites is based on at least one of a satellite constellation, a public land mobile network (PLMN) identity, a frequency, a neighbor satellite list, a tracking area, or a geographical location.

7. The UE of claim 5, wherein the at least one processor is further configured to execute the instructions to cause the UE to:
receive, via the at least one transceiver, a request acknowledgement after transmitting the request, the request acknowledgement indicating one or more broadcasting SI messages scheduled for broadcasting; and
change to an idle state after receiving the request acknowledgement,
wherein the at least one processor is configured to execute the instructions to cause the UE to receive the response message while in the idle state, the response message including at least one of an SI message identifier, a satellite group identifier, or a beam identifier of the at least one communication satellite.

8. The UE of claim 7, wherein the request acknowledgement further indicates secondary information being skipped, the secondary information being based on the request and including information associated with at least one or more groups of satellites.

9. The UE of claim 5, wherein the at least one processor is further configured to execute the instructions to cause the UE to:
transmit, via the at least one transceiver and after reception of the resource configuration, an SI request message including the request for the beam information, the SI request message including a list of requested SI messages including at least the first SI message, wherein the SI request message includes an identifier, and the response message includes at least one of the satellite information or the beam information associated with the identifier.

10. The UE of claim 9, wherein the SI request message includes an indicator indicating that the SI request message corresponds to an SI message or to the identifier associated with the group of satellites or the beam information, wherein the at least one processor is further configured to execute the instructions to cause the UE to:
receive, via the at least one transceiver, an acknowledgement message to the SI request message based on the indicator, the acknowledgement message including at least one of a satellite information identifier or a beam information identifier.

11. The UE of claim 9, wherein the SI request message is extended to carry at least one of a satellite group identifier or a beam information identifier.

12. The UE of claim 4, wherein the at least one processor is further configured to execute the instructions to cause the UE to:
transmit, while in a connected state, a dedicated SIB request message including an identifier indicating the request for the beam information.

13. The UE of claim 12, wherein the at least one processor is further configured to execute the instructions to cause the UE to:
include the identifier in a requested SIB list of the dedicated SIB request message.

14. The UE of claim 12, wherein the at least one processor is configured to execute the instructions to cause the UE to transmit the request included in the dedicated SIB request message based on a validity associated with the satellite information is expiring, and wherein the request includes a satellite identifier corresponding to the satellite information.

15. The UE of claim 12, wherein, to transmit the request, the at least one processor is configured to execute the instructions to cause the UE to:
transmit the request in the dedicated SIB request message for the beam information based on an inability to perform measurements for the at least one communication satellite, the request including a satellite identifier corresponding to the at least one communication satellite, and
the response message includes the satellite information associated with the at least one communication satellite.

16. The UE of claim 1, wherein the request further requests one or more of:
position information associated with the at least one communication satellite,
velocity information associated with the at least one communication satellite,
location information of the at least one communication satellite, the location information including Earth-centered, Earth-fixed coordinates, and
orbital parameters associated with the at least one communication satellite, the orbital parameters including one or more of: a semi-major axis, eccentricity, inclination, right ascension of an ascending node, argument of periapsis, mean anomaly at a reference point in time, or an epoch.

17. The UE of claim 1, wherein the request further requests one or more of system information (SI) and satellite information, and wherein the response message includes one or more of a non-terrestrial network system information block (NTN SIB) associated with the at least one communication satellite and the satellite information associated with the at least one communication satellite.

18. The UE of claim 1, wherein the request comprises an identifier associated with each of the one or more beams.

19. The UE of claim 1, wherein the one or more beams is a subset of a set of beams supported by the at least one communication satellite.

20. The UE of claim 1, wherein the beam property includes at least one of:
   a center of each beam of the one or more beams,
   a beam footprint size for each of the one or more beams,
   an indicator indicating whether a cell supported by each of the one or more beams is fixed, or
   an elevation associated with each of the one or more beams.

21. A method of wireless communication by a user equipment (UE), comprising:
   transmitting a request for beam information associated with at least one communication satellite; and
   receiving a response message after transmitting the request, the response message including the beam information that includes a beam property of one or more beams supported by the at least one communication satellite.

22. A base station, comprising:
   at least one memory comprising instructions;
   at least one transceiver; and
   at least one processor configured to execute the instructions to cause the base station to:
      receive, via the at least one transceiver, a request from a user equipment (UE) for beam information associated with at least one communication satellite; and
      transmit, via the at least one transceiver, a response message based on the request, the response message including the beam information that includes a beam property of one or more beams supported by the at least one communication satellite.

23. The base station of claim 22, wherein the beam information associated with the at least one communication satellite further includes one or more of:
   a quantity of beams supported by the at least one communication satellite, and
   an indicator indicating shared beam properties associated with the beams supported by the at least one communication satellite.

24. The base station of claim 22, wherein the response message comprises one or more of:
   an acknowledgement that requested information is available for acquiring via one or more broadcast system information messages, or
   a downlink message including the requested information.

25. The base station of claim 22, wherein the at least one processor is further configured to execute the instructions to cause the base station to:
   transmit, via the at least one transceiver, a list of SI messages including one or more SI messages, each SI message of the list of SI messages associated with a broadcast status set to either broadcasting or not broadcasting,
   wherein the request indicates a first SI message, wherein the first SI message is included in the list of SI messages, wherein the first SI message has the broadcast status set to not broadcasting, and wherein the first SI message carries at least one of satellite information or the beam information.

26. The base station of claim 25, wherein the at least one processor is further configured to execute the instructions to cause the base station to:
   transmit, via the at least one transceiver, a resource configuration including a mapping of SI messages of the list of SI messages to respective physical random access channel (PRACH) resources; and
   decode the request for the beam information using at least one of:
      a first PRACH resource of the resource configuration that maps to the first SI message, or
      a second PRACH resource of the resource configuration that maps to a group of satellites including the at least one communication satellite,
   wherein the at least one processor is further configured to execute the instructions to cause the base station perform a random access procedure with the UE while receiving the request.

27. The base station of claim 26, wherein the at least one processor is further configured to execute the instructions to cause the base station to:
   transmit, via the at least one transceiver, a request acknowledgement after receiving the request, the request acknowledgement indicating one or more broadcasting SI messages scheduled for broadcasting,
   wherein the response message includes an SI message identifier, a group of satellites identifier, or a beam identifier of the at least one communication satellite.

28. The base station of claim 27, wherein the request acknowledgement further indicates secondary information being skipped, the secondary information being based on the request and including information associated with at least one or more groups of satellites.

29. The base station of claim 25, wherein, to receive the request, the at least one processor is configured to execute the instructions to cause the base station to:
   receive, via the at least one transceiver, an SI request message including the request, the SI request message including a list of requested SI messages including at least the first SI message, wherein the SI request message includes an identifier, and the response message includes at least one of the satellite information or the beam information associated with the identifier.

30. The base station of claim 29, wherein the SI request message includes an indicator indicating that the SI request message corresponds to an SI message or to the identifier associated with a group of satellites or the beam information, and wherein the at least one processor is further configured to execute the instructions to cause the base station to:
   transmit an acknowledgement message to the SI request message based on the indicator, the acknowledgement message including at least one of a satellite information identifier or a beam information identifier.

31. The base station of claim 29, wherein the SI request message is extended to carry at least one of a group of satellites identifier or a beam information identifier.

32. The base station of claim 25, wherein, to receive the request, the at least one processor is configured to execute the instructions to cause the base station to:
   receive, based on the first SI message having the broadcast status set to not broadcasting, a dedicated SIB request message that includes an identifier indicating the request for the beam information.

33. The base station of claim 32, wherein the dedicated SIB request message includes a requested SIB list including the identifier.

34. The base station of claim 32, wherein the request included in the dedicated SIB request message includes a satellite identifier corresponding to the at least one communication satellite, and wherein the at least one processor is configured to execute the instructions to cause the base station to transmit the response message including the satellite information based on the satellite identifier.

35. The base station of claim 22, wherein the request further requests one or more of:
   position information associated with the at least one communication satellite,
   velocity information associated with the at least one communication satellite,
   location information of the at least one communication satellite, the location information including Earth-centered, Earth-fixed coordinates, and
   orbital parameters associated with the at least one communication satellite, the orbital parameters including one or more of: a semi-major axis, eccentricity, inclination, right ascension of an ascending node, argument of periapsis, mean anomaly at a reference point in time, or an epoch.

36. The base station of claim 22, wherein the request further requests one or more of system information (SI) and satellite information, and wherein the response message includes one or more of a non-terrestrial network system information block (NTN SIB) associated with the at least one communication satellite and the satellite information associated with the at least one communication satellite.

37. A method of wireless communication by a base station, comprising:
   receiving, from a user equipment (UE), a request for beam information associated with at least one communication satellite; and
   transmitting a response message based on the request, the response message including the beam information that includes a beam property of one or more beams supported by the at least one communication satellite.

* * * * *